United States Patent
Zhang et al.

(10) Patent No.: US 8,437,440 B1
(45) Date of Patent: May 7, 2013

(54) PHY FRAME FORMATS IN A SYSTEM WITH MORE THAN FOUR SPACE-TIME STREAMS

(75) Inventors: Hongyuan Zhang, Fremont, CA (US); Rohit U. Nabar, Sunnyvale, CA (US); Sudhir Srinivasa, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 424 days.

(21) Appl. No.: 12/790,158

(22) Filed: May 28, 2010

Related U.S. Application Data

(60) Provisional application No. 61/181,804, filed on May 28, 2009, provisional application No. 61/182,994, filed on Jun. 1, 2009, provisional application No. 61/182,999, filed on Jun. 1, 2009, provisional application No. 61/184,718, filed on Jun. 5, 2009, provisional application No. 61/228,918, filed on Jul. 27, 2009, provisional application No. 61/260,234, filed on Nov. 11, 2009, provisional application No. 61/312,370, filed on Mar. 10, 2010, provisional application No. 61/320,238, filed on Apr. 1, 2010.

(51) Int. Cl.
*H04L 7/00* (2006.01)

(52) U.S. Cl.
USPC .......................................................... 375/366

(58) Field of Classification Search .................. 375/365, 375/366, 368
See application file for complete search history.

(56) References Cited

U.S. PATENT DOCUMENTS

2005/0276347 A1* 12/2005 Mujtaba et al. .............. 375/299
2009/0207765 A1* 8/2009 Yamaura ....................... 370/310

OTHER PUBLICATIONS

S. A. Mujtaba, "IEEE P802.11—Wireless LANs, TGn Sync Proposal Technical Specification," *The Institute of Electrical and Electronics Engineers, Inc.*, doc.: IEEE 802.11-04/0889r6, May 2005.

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, (1999).

IEEE Std 802.11b-2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band-Corrigendum 1," *The Institute of Electrical and Electronics Engineers, Inc.*, Nov. 7, 2001.

(Continued)

*Primary Examiner* — Kevin Kim

(57) ABSTRACT

A method for generating a data unit for transmission via a communication channel includes generating a preamble of the data unit, including generating a set of more than four training fields and applying a different spatial mapping to each training field in the set of training fields; and generating a data portion of the data unit, wherein the data portion is transmitted using more than four space-time streams, so that a receiver device can receive the data portion via the more than four space-time streams using channel information derived from the set of training fields.

26 Claims, 11 Drawing Sheets

OTHER PUBLICATIONS

IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band," *The Institute of Electrical and Electronics Engineers, Inc.*, Apr. 2003.

"IEEE P802.11n™/D3.00, Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, Sep. 2007.

* cited by examiner

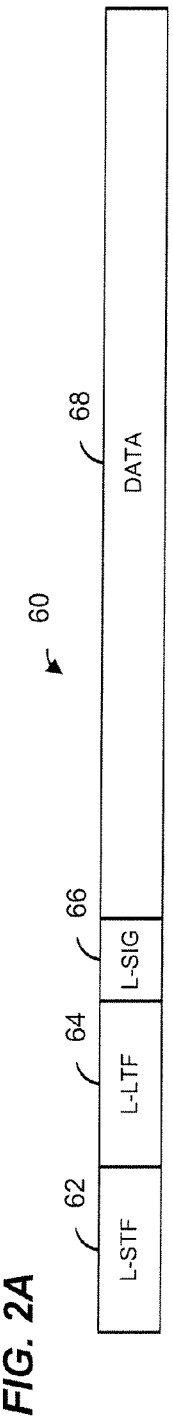
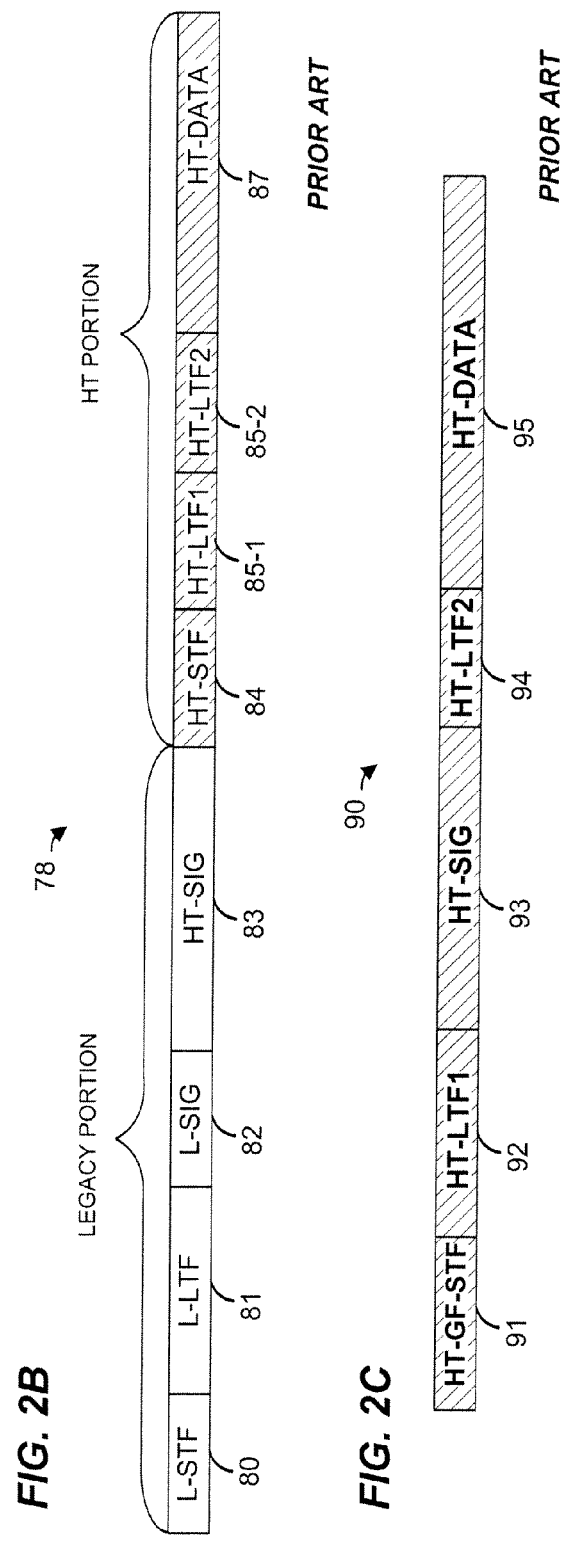
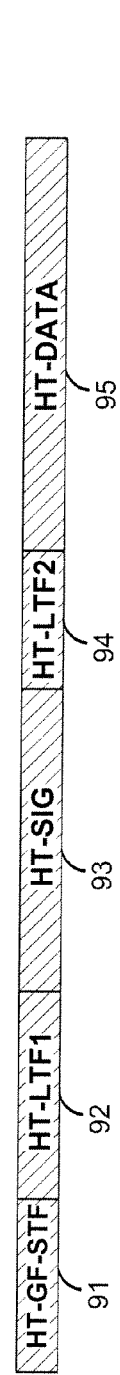
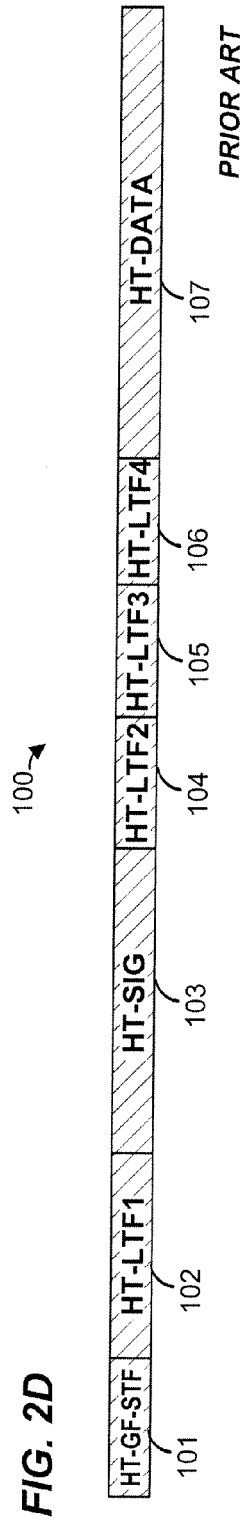

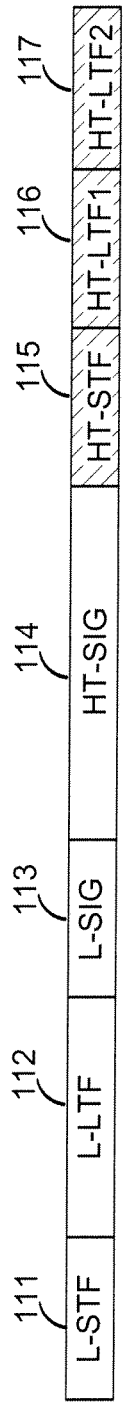
FIG. 2E *PRIOR ART*
FIG. 2F *PRIOR ART*

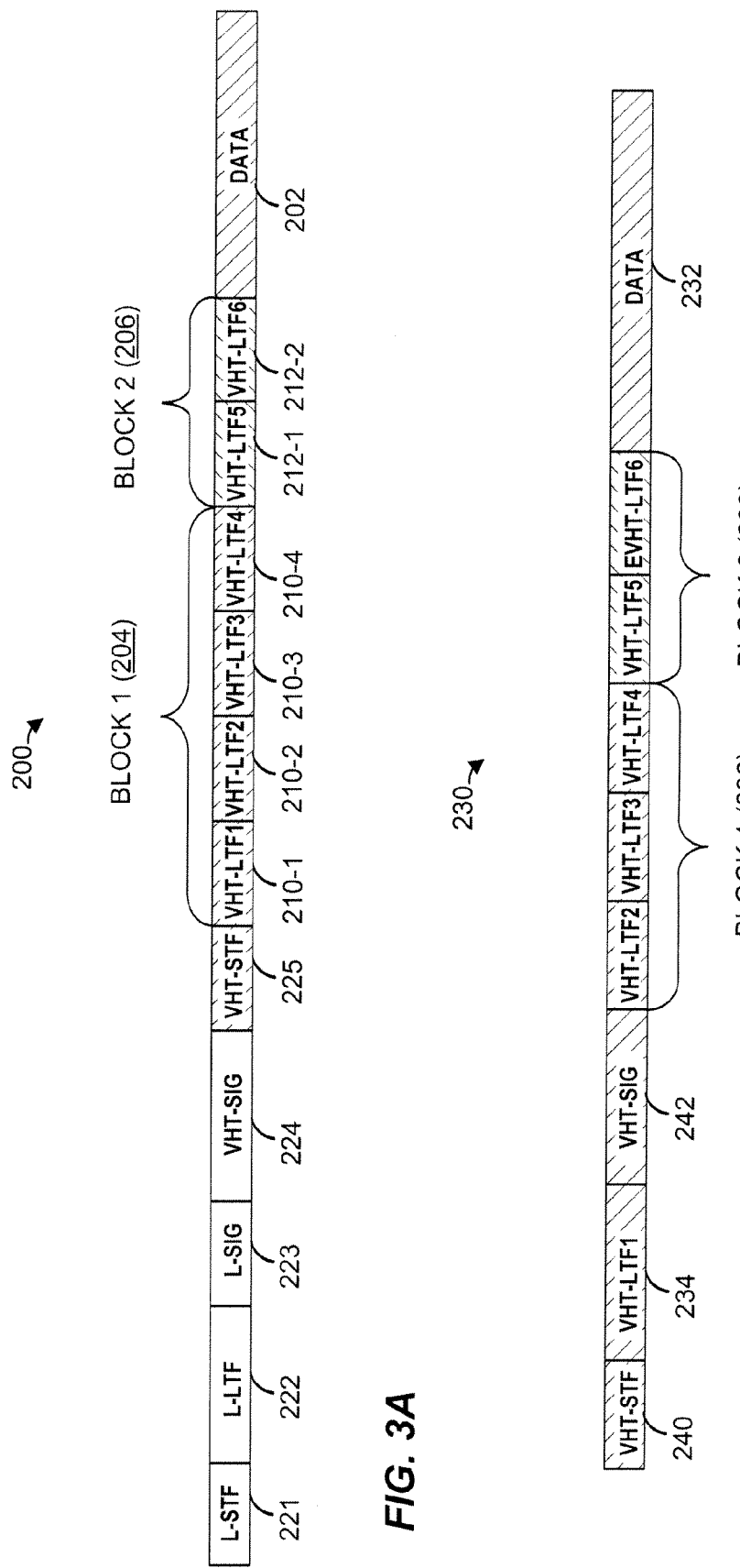

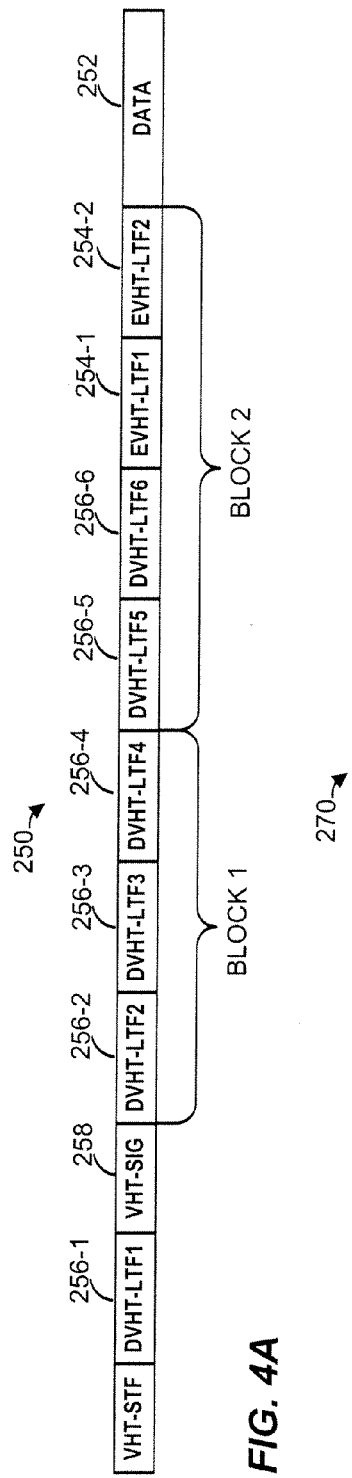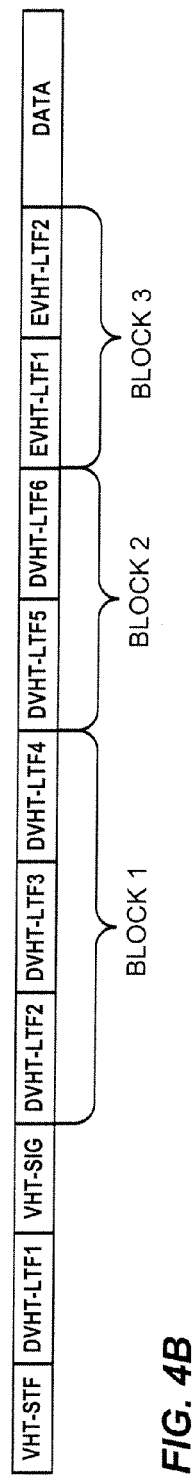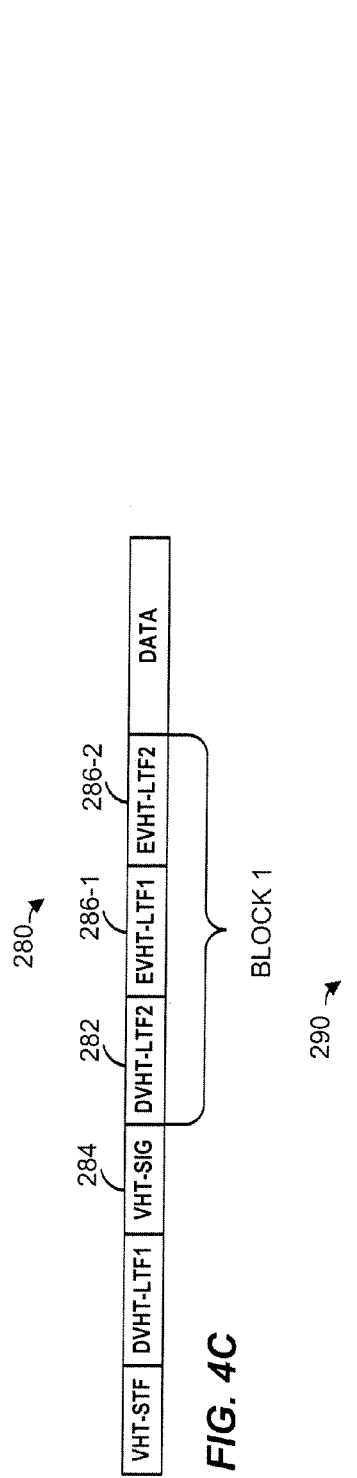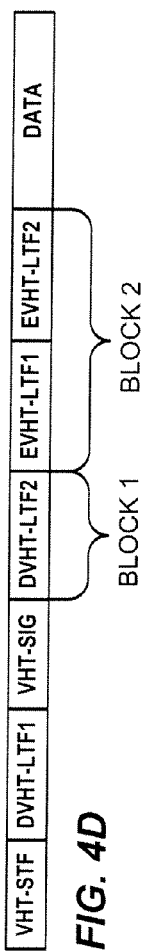
FIG. 4A
FIG. 4B
FIG. 4C
FIG. 4D

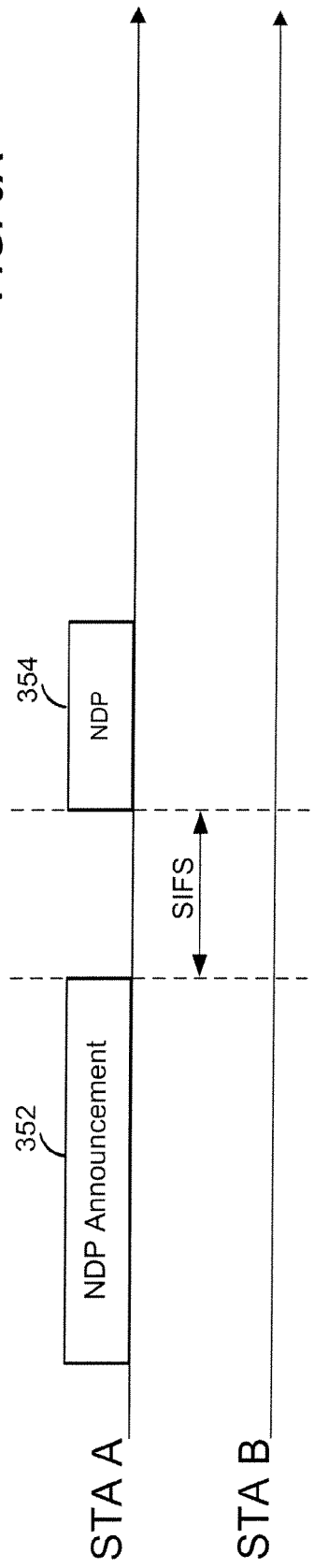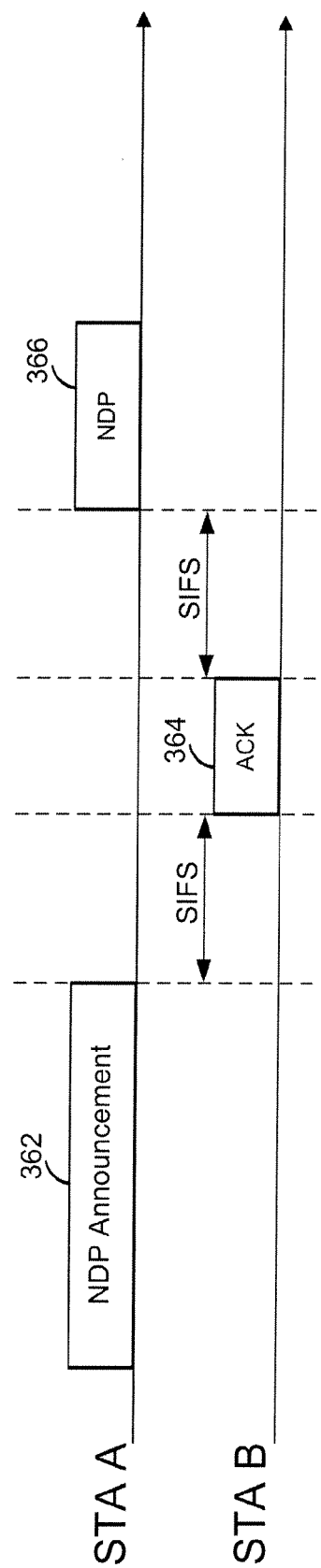

PHY FRAME FORMATS IN A SYSTEM WITH MORE THAN FOUR SPACE-TIME STREAMS

CROSS-REFERENCES TO RELATED APPLICATIONS

This disclosure claims the benefit of the following U.S. Provisional Patent Applications:

U.S. Provisional Patent Application No. 61/181,804, entitled "NDP Sounding For More Than Four Spatial Dimensions in WLAN," filed May 28, 2009, U.S. Provisional Patent Application No. 61/182,994, entitled "NDP Sounding For More Than Four Spatial Dimensions in WLAN," filed on Jun. 1, 2009;

U.S. Provisional Patent Application No. 61/182,999, entitled "MIMO-OFDM Preamble For More Than Four Space-Time Streams in WLAN," filed Jun. 1, 2009;

U.S. Provisional Patent Application No. 61/184,718, entitled "MIMO-OFDM Preamble For More Than Four Space-Time Streams in WLAN," filed Jun. 5, 2009;

U.S. Provisional Patent Application No. 61/228,918, entitled "MIMO-OFDM Preamble For More Than Four Space-Time Streams in WLAN," filed Jul. 27, 2009;

U.S. Provisional Patent Application No. 61/260,234, entitled "Preamble VHTLTF," filed Nov. 11, 2009;

U.S. Provisional Patent Application No. 61/312,370, entitled "VHTLTF P Matrix Design" filed Mar. 10, 2010; and U.S. Provisional Patent Application No. 61/320,238, entitled "VHTLTF P Matrix Design" filed Apr. 1, 2010

The disclosures of all of the above-referenced patent applications are hereby incorporated by reference herein in their entireties.

FIELD OF THE DISCLOSURE

The present disclosure relates generally to communication networks and, more particularly, to wireless local area networks that utilize orthogonal frequency division multiplexing (OFDM) and multiple-input, multiple output (MIMO) mode of communication.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Wireless local area networks (WLANs) have evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, and the IEEE 802.11n Standard specifies a single-user peak throughput of 600 Mbps. Work has begun on a new standard, IEEE 802.11ac, that promises to provide even greater throughput.

SUMMARY

In an embodiment, a method for generating a data unit for transmission via a communication channel includes generating a preamble of the data unit, including generating a set of more than four training fields and applying a different spatial mapping to each training field in the set of training fields; and generating a data portion of the data unit, wherein the data portion is transmitted using more than four space-time streams, so that a receiver device can receive the data portion via the more than four space-time streams using channel information derived from the set of training fields.

In another embodiment, a communication device includes a physical layer (PHY) preamble generator configured to generate a preamble of a data unit, including a training field generator configured to generate a training field and a spatial mapping module configured to apply a different spatial mapping to each of at least five instances of the training field to be included in the preamble, where the at least five instances of the training field correspond to at least five space-time streams; and where the communication device further includes a data portion generator to cause a data portion of the data unit to be transmitted using the at least five space-time streams.

In another embodiment, a method for sounding a communication channel includes generating a set of at least five training fields, where the set of training fields corresponds to a set of at least five space-time streams, such that a receiver device can estimate the set of space-time streams using the set of training fields, and causing the data unit to be transmitted with the set of at least five training fields and without a data portion.

In another embodiment, a communication device includes a physical layer (PHY) preamble generator configured to generate a preamble of a data unit that does not include a data portion, including a training field generator configured to generate a training field, and a spatial mapping module configured to apply a different spatial mapping to each of at least five instances of the training field to be included in the preamble, where the at least five instances of the training field correspond to at least five space-time streams.

In another embodiment, a method of communicating via a communication channel includes generating a first data unit that includes a first set of N training fields, where the first set of training fields corresponds to a first set of N space-time streams associated with the communication channel; generating a second data unit that includes a second set of M training fields, where the second set of training fields corresponds to a second set of M space-time streams associated with the communication channel; and where the first set of space-time streams is distinct from the second set of space-time streams, such that a receiver device can estimate the N+M space-time streams associated with the communication channel using the first data unit and the second data unit.

In another embodiment, a communication device includes a physical layer (PHY) preamble generator configured to generate a preamble of a data unit to be transmitted via a communication channel, including a training field generator configured to generate a training field, a block controller configured to generate a plurality of blocks, where each of the plurality of blocks includes two or more instances of the training field, and a spatial mapping module configured to apply a different spatial mapping scheme to each of the plurality of blocks, such that each of the instances of the training field trains a different space-time stream associated with the communication channel.

BRIEF DESCRIPTION OF THE DRAWINGS

FIG. 2A is a diagram of a prior art data unit format used in a communication system in which all devices support only a single spatial stream;

FIG. 2B is a diagram of a prior art data unit format used in a communication system in which some devices support only a single spatial stream, and other devices support two spatial streams;

FIG. 2C is a diagram of a prior art data unit format used in a communication system in which all devices support two spatial streams;

FIG. 2D is a diagram of a prior art data unit format used in a communication system in which all devices support four spatial streams;

FIG. 2E is a diagram of a prior art sounding data unit format used in a communication system in which some devices support only one spatial stream, and some devices support two spatial streams;

FIG. 2F is a diagram of a prior art sounding data unit format used in a communication system in which all devices support two spatial streams;

FIG. 3A is a diagram of an example data unit in which a data portion is modulated with six space-time streams for use in a mixed mode of operation, according to an embodiment;

FIG. 3B is a diagram of an example data unit in which a data portion is modulated with six space-time streams for use in a Greenfield mode of operation, according to an embodiment;

FIG. 4A is a diagram of an example format of a staggered sounding data unit that includes a preamble with two blocks of training fields, according to an embodiment;

FIG. 4B is a diagram of an example format of a staggered sounding data unit that includes a preamble with three blocks of training fields, according to an embodiment;

FIG. 4C is a diagram of an example format of a staggered sounding data unit that includes a preamble with a single block of training fields, according to an embodiment;

FIG. 4D is a diagram of another example format of a staggered sounding data unit that includes a preamble with two blocks of training fields, according to an embodiment;

FIG. 6A is a timing diagram of a data unit announcing a subsequent sounding data unit and the sounding data unit, separated by a Short Inter Frame Space (SIFS);

FIG. 6B is a timing diagram of a data unit announcing a subsequent sounding data unit, an acknowledgement responsive to the announcement, and the sounding data unit;

DETAILED DESCRIPTION

Figure 1:
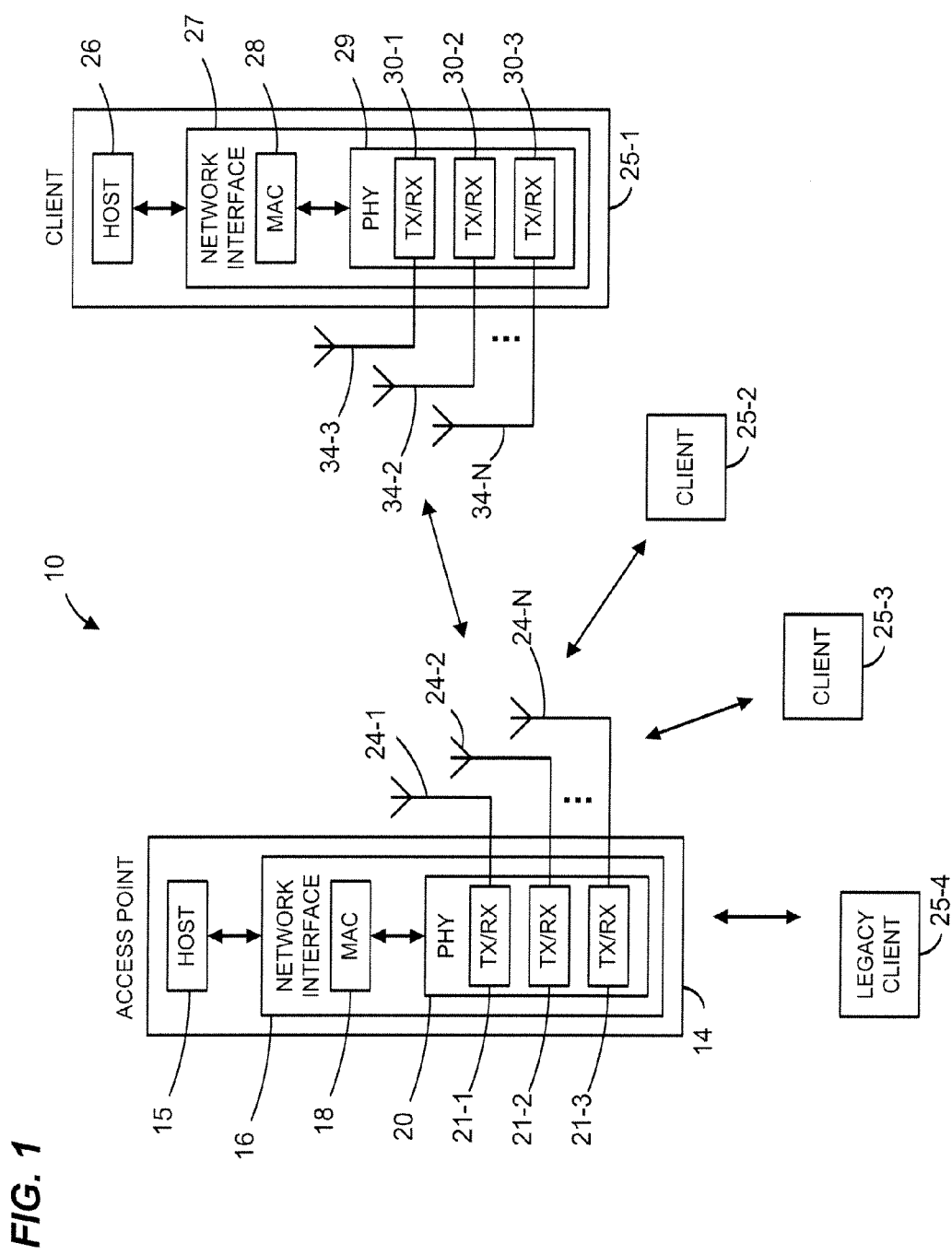
FIG. 1 is a block diagram of an example communication system in which devices exchange information via a communication link associated with more than four spatial streams, according to an embodiment.

FIG. 1 is a block diagram of an example wireless local area network (WLAN) 10 in which devices such as an Access Point (AP) 14 exchange information using OFDM techniques in a MIMO mode. In embodiments described below, at least some of the devices in the WLAN 10 support communication using more than four space-time streams. To enable receiving devices to properly demodulate data portions of data units, transmitting devices include training fields, generated so as to enable accurate estimation of the MIMO channel, in the physical-layer (PHY) preamble of at least some of the data units. The number of training fields in the PHY preamble of a data unit corresponds to the number of space-time streams used for modulating the data portion of the same data unit or of a subsequently transmitted data unit, in some embodiments. Further, in some of these embodiments, transmitting devices specify the number of training fields (and/or the number of space-time streams to be used) via one or several informational elements included in the PHY preamble.

At least some of the devices operating in the WLAN 10 apply a different vector of a matrix P, which maps bits or symbols to spatial streams, to each training field to be transmitted in a PHY preamble, and subsequently map the spatial streams to transmit chains using an antenna map or spatial mapping matrix Q. According to some embodiments, a transmitting device generates several blocks of training fields in a preamble using a separate matrix P and/or a separate spatial mapping matrix Q for each block. In some embodiments, each block includes up to four training fields. In this manner, the preamble is generated so as to allow a receiving device to estimate the MIMO channel between the transmitting device and the receiving device, and accordingly demodulate data transmitted via more than four space-time streams in the data unit that includes the preamble or in the subsequent data units. Thus, devices that implement embodiments of techniques set forth in the present disclosure are capable of communicating in high-throughput (HT) and very-high-throughput (VHT) modes.

According to other embodiments, communicating devices use a matrix P of higher dimensionality (e.g., 5, 6, 7, 8) when generating or receiving training fields. For convenience, a matrix P having dimensionality of five or above is referred to hereinafter as a "large P matrix." In at least some of these embodiments, training fields are grouped into a single block when a large P matrix is P used. Depending on the embodiment, every element of a large P matrix is either 1 or −1, an integer not limited to 1 or −1, or a complex number. As discussed in more detail below, different ranges of values used to define a P matrix are associated with different levels of computational complexity and bandwidth utilization.

In an embodiment, the AP 14 includes a host processor 15 coupled to a network interface 16. The network interface 16 includes a medium access control (MAC) unit 18 and a physical layer (PHY) unit 20. The PHY unit 20 includes a plurality of transceivers 21, each associated with corresponding RF chain (not shown), and the transceivers are coupled to N antennas 24. In general, the AP 14 can include different numbers (e.g., 1, 2, 4, 5, 6, 8, etc.) of transceivers 21 and antennas 24 in other embodiments. In one embodiment, the MAC unit 18 and the PHY unit 20 are configured to operate according to a communication protocol generally similar to the IEEE 802.11 ac Standard (now in the process of being standardized), for example, and capable of supporting more than four space-time streams in a MIMO channel (hereinafter, for convenience, a very high throughput (VHT) protocol). In another embodiment, the MAC unit 18 and the PHY unit 20 are configured to operate according to communication protocols such as the IEEE 802.11n Standard and/or the IEEE 802.11a Standard in addition to the VHT protocol. As is known, devices that operate according to the IEEE 802.11n Standard support MIMO channels with at most four space-time streams, and devices that operate according to the IEEE 802.11a Standard support only one space-time stream. The IEEE 802.11a and 802.11n Standards are referred to herein as "legacy protocols."

The WLAN 10 includes a plurality of client stations 25. Although four client stations 25 are illustrated in FIG. 1, the WLAN 10 can include different numbers (e.g., 1, 2, 3, 5, 6, etc.) of client stations 25 in various scenarios and embodiments. At least one of the client stations 25 (e.g., client station 25-1) is configured to operate at least according to the VHT communication protocol. In some embodiments, at least one of the client stations 25 is not configured to operate according to the VHT communication protocol, but is configured to operate according to at least one of the legacy communication protocols (referred to herein as a "legacy client station").

The client station 25-1 includes a host processor 26 coupled to a network interface 27. The network interface 27 includes a MAC unit 28 and a PHY unit 29. The PHY unit 29 includes a plurality of transceivers 30, and the transceivers 30 are coupled to N antennas 34. In general, the client station 25-1 can include different numbers (e.g., 1, 2, 4, 5, 6, 8, etc.) of transceivers 30 and antennas 34 in other embodiments.

In an embodiment, one or both of the client stations 25-2 and 25-3, has a structure the same as or similar to the client station 25-1. In an embodiment, the client station 25-4, has a structure similar to the client station 25-1. In these embodiments, the client stations 25 structured the same as or similar to the client station 25-1 have the same or a different number of transceivers and antennas. For example, the client station 25-2 has only two transceivers and two antennas, according to an embodiment.

According to an embodiment, the client station 25-4 is a legacy client station, i.e., the client station 25-4 is not enabled to receive and fully decode a data unit that is transmitted by the AP 14 or another client station 25 according to the VHT communication protocol. Similarly, according to an embodiment, the legacy client station 25-4 is not enabled to transmit data units according to the VHT communication protocol. On the other hand, the legacy client station 25-4 is enabled to receive and fully decode and transmit data units according to one or several legacy communication protocols.

In various embodiments, the PHY unit 20 of the AP 14 is configured to generate data units conforming to the VHT communication protocol and having formats described hereinafter. The transceiver(s) 21 is/are configured to transmit the generated data units via the antenna(s) 24. Similarly, the transceiver(s) 24 is/are configured to receive the data units via the antenna(s) 24. The PHY unit 20 of the AP 14 is configured to process received data units conforming to the VHT communication protocol and having formats described hereinafter and to determine that such data units conform to the VHT communication protocol, according to various embodiments.

In various embodiments, the PHY unit 29 of the client device 25-1 is configured to generate data units conforming to the VHT communication protocol and having formats described hereinafter. The transceiver(s) 30 is/are configured to transmit the generated data units via the antenna(s) 34. Similarly, the transceiver(s) 30 is/are configured to receive data units via the antenna(s) 34. The PHY unit 29 of the client device 25-1 is configured to process received data units conforming to the VHT communication protocol and having formats described hereinafter and to determine that such data units conform to the VHT communication protocol, according to various embodiments. As discussed in more detail below, the PHY unit 29 in some embodiments is capable of estimating a MIMO channel that includes more than four space-time streams (e.g., 5, 6, 7, 8, etc.). Using the estimated channel information, the client devices 25-1 demodulates information transmitted via more than four space-time streams in the same data unit or in subsequently transmitted one or several data units.

In some scenarios, transmitting devices generate data units that do not include a data payload and that are for "sounding" the MIMO channel. These sounding data units are referred to herein as no-data packets (NDPs). In other scenarios, transmitting devices generate data units that include a preamble portion with information sufficient for estimating a MIMO channel with N>4 space-time streams, and a payload portion for which less than N space-time streams are used. In other words, these data units "sound" one or several space-time streams in addition to those used within the data unit to deliver data. These data units are referred to herein as "staggered" data units or sounding packets with $N_{STS}$ space-time streams used for data transfer and $N_{ESS}$ additional space-streams being sounded. In still other scenarios, transmitting devices generate data units in which the preamble portions include only fields that are necessary to estimate the space-time streams used to deliver data portions of the data units, and do not include fields to probe or sound additional space-time streams.

To better explain the formats of data units used by devices in the WLAN 10 or a similar communication network that supports the VHT protocol according to the present disclosure, FIGS. 2A-F illustrate several prior art formats of data units consistent with the legacy communication protocols. In the formats of FIGS. 2A-F, a short training field (STF) is used for packet detection, automatic gain control (AGC), etc.; a long training field (LTF) is used for channel estimation and fine synchronization; a signal field (SIG) is used for signaling basic PHY parameters to receiving devices; and a data payload field (DATA), when included, is used to communicate payload data to the receiving devices. The SIG field generally includes a modulation and coding scheme (MCS) sub-field, and the information in the DATA field is modulated and encoded using MIMO-OFDM in accordance to the MCS sub-field.

FIG. 2A is a diagram of a prior art data unit 60 that the legacy client station 25-4 is configured to transmit to the AP 14 via orthogonal frequency domain multiplexing (OFDM) modulation. The data unit 60 conforms to the IEEE 802.11a Standard and occupies a 20 Megahertz (MHz) band. The data unit 60 includes a preamble having a legacy short training field (L-STF) 62, a legacy long training field (L-LTF) 64, and a legacy signal field (L-SIG) 66. The data unit 60 also includes a data portion 68.

FIG. 2B is a diagram of a prior art OFDM data unit 78 that the legacy client station 25-4 is configured to transmit to the AP 14 using two space-time streams for a data portion. The data unit 78 conforms to the IEEE 802.11n Standard, occupies a 20 MHz band, and is designed for mixed mode situations, i.e., when the WLAN includes one or more client stations that conform to the IEEE 802.11a Standard but not the IEEE 802.11n Standard. The data unit 78 includes a legacy preamble portion having an L-STF 80, an L-LTF 81, an L-SIG 82, and a high throughput signal field (HT-SIG) 83. The data unit 78 also includes a high-throughput portion (shaded for clarity of illustration) having a high throughput short training field (HT-STF) 84, two data high throughput long training fields (HT-LTFs) 85-1 and 85-2, and a data portion 87.

FIG. 2C is a diagram of a prior art OFDM data unit 90 that the legacy client station 25-4 is configured to transmit to the AP 14 using two space-time streams for a data portion. The data unit 90 conforms to the IEEE 802.11n Standard, occupies a 20 MHz band, and is designed for "Greenfield" situations, i.e., when the WLAN does not include any client stations that conform to the IEEE 802.11a Standard but not the IEEE 802.11n Standard. The data unit 90 includes a preamble having a high throughput Greenfield short training field (HT-GF-STF) 91, a first high throughput long training field (HT-LTF1) 92, a HT-SIG 93, the second high throughput long training field (HT-LTF2) 94, and a data portion 95.

FIG. 2D is a diagram of a prior art OFDM data unit 100 that the legacy client station 25-4 is configured to transmit to the AP 14 using four space-time streams for a data portion. The data unit 100 conforms to the IEEE 802.11n Standard, occupies a 20 MHz band, and is designed for "Greenfield" situations, i.e., when the WLAN does not include any client stations that conform to the IEEE 802.11a Standard but not the IEEE 802.11n Standard. The data unit 100 includes a preamble having a high throughput Greenfield short training field (HT-GF-STF) 101, a first high throughput long training field (HT-LTF1) 102, a HT-SIG 103, and a block of three HT-LTF fields 104-106, and a data portion 107.

FIG. 2E is a diagram of a prior art OFDM sounding data unit 110 that the legacy client station 25-4 is configured to transmit to the AP 14 to sound two space-time streams. The data unit 110 conforms to the IEEE 802.11n Standard, occupies a 20 MHz band, and is designed for mixed mode situations, i.e., when the WLAN includes one or more client stations that conform to the IEEE 802.11a Standard but not the IEEE 802.11n Standard. The data unit 110 includes a legacy preamble portion having an L-STF 111, an L-LTF 112, an L-SIG 113, and a high throughput signal field (HT-SIG) 114. The data unit 110 also includes a high-throughput portion having a high throughput short training field (HT-STF) 115, two data high throughput long training fields (HT-LTFs) 116 and 117. The data unit 110 does not include a data portion.

FIG. 2F is a diagram of a prior art OFDM data unit 120 that the legacy client station 25-4 is configured to transmit to the AP 14 to sound two space-time streams. The data unit 120 conforms to the IEEE 802.11n Standard, occupies a 20 MHz band, and is designed for "Greenfield" situations, i.e., when the WLAN does not include any client stations that conform to the IEEE 802.11a Standard but not the IEEE 802.11n Standard. The data unit 120 includes a preamble having a high throughput Greenfield short training field (HT-GF-STF) 121, a first high throughput long training field (HT-LTF1) 122, a HT-SIG 123, the second high throughput long training field (HT-LTF2) 124, and a data portion 125

It is noted that the data units discussed above support at most four space-time streams to convey data in a data portion of the data unit, or to sound space-time streams for estimating the corresponding MIMO channel. Receiving devices use at most one block of LTF fields included in the data units 60, 89, 90, 100, 110, or 120 for data demodulation (e.g., the fields 104-106 of the data unit 100 illustrated in FIG. 2D).

To transmit data via more than four space-time streams, or to sound more than four space-time streams for channel estimation, devices operating in the WLAN 10 or a similar communication network utilize the formats discussed hereinafter with reference to FIGS. 3A-B, FIGS. 4A-D, etc., in embodiments of the present disclosure. In these embodiments, data units include multiple blocks of very high throughput long training fields (VHT-LTFs), with the total number of VHT-LTFs being at least as large as the number of space-time streams $N_{STS}$ used by the VHT communication protocol. For example, to enable data demodulation when six space-streams are used to transmit a data payload (e.g., the data portion of a data unit), a transmitting device in one embodiment generates two blocks of VHT-LTFs, with the blocks having four VHT-LTFs and two VHT-LTFs, respectively.

Prior to discussing these formats in more detail, a mathematical model that describes the generation of a PHY preamble according to the embodiments of the present disclosure is briefly considered. In an embodiment, a training field VHT-LTF is defined as a finite sequence of values (e.g., "1, 1, −1, −1, 1, . . . 1, 1"). For each sub-carrier used in the OFDM mode, an instance of the VHT-LTF in a block m is mapped to a set of space-time streams using a matrix P which, in some embodiments, is defined separately for each block. Each block is thus used to train a certain number of space-time streams. For example, if data is transmitted via six space-time streams (i.e., $N_{STS}=6$), and the VHT-LTFs are grouped into a first block $m_1$ of four VHT-LTFs and a second block $m_2$ of two VHT-LTF, matrices $P_{VHTLTF}^{M1}$ for block $m_1$ and $P_{VHTLTF}^{M2}$ for block $m_2$ can be defined as $$P_{VHTLTF}^{M1} = \begin{bmatrix} 1 & -1 & 1 & 1 \\ 1 & 1 & -1 & 1 \\ 1 & 1 & 1 & -1 \\ -1 & 1 & 1 & 1 \end{bmatrix}, \quad P_{VHTLTF}^{M2} = \begin{bmatrix} 1 & 1 \\ 1 & -1 \end{bmatrix}$$

It is noted that each of the matrices $P_{VHTLTF}^{M1}$ and $P_{VHTLTF}^{M2}$ is a Hadamard matrix. In an embodiment, $P_{VHTLTF}^{M1}$ and $P_{VHTLTF}^{M2}$ are portions of a larger matrix P.

In one such embodiment, a matrix P used for eight VHT-LTFs has eight rows and eight columns. In an embodiment, each element of P is +1 or −1. In another embodiment, each element of P is a complex number (e.g., a Discrete Fourier Transform matrix is used as P). In another embodiment, some elements of P are integers other than +1 or −1.

According to some embodiments, $P_{VHTLTF}^{M1}$ is defined as a copy of a matrix $P_{4\times4}$ of dimensionality equal to four, and $P_{VHTLTF}^{M2}$ is a sub-matrix of $P_{4\times4}$. In one scenario consistent with these embodiments, five VHT-LTFs are generated for $N_{STS}=5$, with four VHT-LTFs in the first block and one VHT-LTFs in the second block. In another scenario, $N_{STS}=6$, four VHT-LTFs are included the first block and two VHT-LTFs are included in the second block. Accordingly, $P_{VHTLTF}^{M2}$ is a sub-matrix of $P_{4\times4}$ with dimensionality equal to two. In yet other scenarios, $N_{STS}=7$ or 8, four VHT-LTFs are included the first block and four VHT-LTFs are included in the second block.

As each VHT-LTF in one of the blocks is generated, a separate column of the corresponding matrix P is used to map the values to space-time streams. For example, the first column of the matrix $P_{VHTLTF}^{M1}$ is applied to each value in the sequence defining the first instance of VHT-LTF of the block $m_1$, the second column of the matrix $P_{VHTLTF}^{M1}$ is applied to each value in the sequence defining the second instance of VHT-LTF of the block $m_1$, etc. In an embodiment, each instance of VHT-LTF is an OFDM symbol. Similarly, the first column of the matrix $P_{VHTLTF}^{M2}$ is applied to each value in the sequence defining the first instance of VHT-LTF of the block $m_2$, and the first column of the matrix $P_{VHTLTF}^{M2}$ is applied to each value in the sequence defining the second instance of VHT-LTF of the block $m_2$.

In at least some of the embodiments, a frequency-domain Cyclic Delay Diversity (CDD) matrix D is applied to each of the resulting space-time streams of the OFDM-MIMO channel to avoid undesirable beamforming effects, for example.

Application of the CDD matrix is equivalent to introducing linear phase shifts over different sub-carriers of OFDM in at least some embodiments. In an embodiment, separate matrices $D_{M1}$ and $D_{M2}$ are used for each of the blocks $m_1$ and $m_2$, as well as for one or several short training fields VHT-STFs and the data portion of the data unit, if included.

The space-time streams are then mapped to transmit chains of the transmitting device, each of which is associated with a corresponding transmit antenna. In general, the number of transmit antennas $N_{TX}$ is greater than or equal to the number of space-time streams $N_{STS}$. In some embodiments, a separate spatial mapping matrix $Q_{M1}$ and $Q_{M2}$ is defined for each of the blocks $m_1$ and $m_2$. In an embodiment, the matrices $Q_{M1}$ and $Q_{M2}$ are portions of a matrix Q that has $N_{TX}$ columns (i.e., as many columns as transmit antennas), with each row corresponding to a space-time stream. To continue with the example introduced above, in the $N_{STS}=6$ configuration with two blocks of 4 and 2 VHT-LTFs respectively, the overall matrix Q has $N_{TX}$ rows and $N_{STS}$ columns, $Q_{M1}$ corresponds to the first four columns of Q, and $Q_{M2}$ corresponds to the last two columns of Q.

In general, a MIMO channel between a transmitting device equipped with $N_{TX}$ transmit antennas (and, therefore, $N_{TX}$ transmit chains) and a receiving device equipped with $N_{RX}$ receive antennas can be represented by a matrix H having $N_{RX}$ rows and $N_{TX}$ columns. In the example considered above, a device receives the signal $s(k)$ transmitted in the blocks $m_1$ and $m_2$ over the channel $H^k$ associated with a carrier k, $N_{RX}$ receive antennas, and $N_{TX}$ transmit antennas as $$x_{m1}^k = H^k Q_{1:N_{TX},1:N_{STS\_M1}}^k D_{N_{STS}}^k P_{1:N_{STS\_M1},1:N_{VHTLTF}} s(k) \text{ and} \quad \text{(Eq. 1)}$$

$$x_{m2}^k = \quad \text{(Eq. 2)}$$
$$H^k Q_{1:N_{TX},N_{STS\_M1}+1:N_{STS\_M1}+N_{STS\_M2}}^k D_{N_{STS\_M2}}^k P_{1:N_{STS\_M2},1:N_{VHTLTF}} s(k)$$

where $N_{STS\_M1}$ is the number of space-time streams trained in the block $m_1$, $N_{STS\_M2}$ is the number of space-time streams trained in the block $m_2$. In Eqs. 1 and 2, the notation $X_{M:N}$ indicates a matrix consisting of columns M through N of matrix X.

Thus, the receiving device can use the two received signals, each corresponding to a respective block of training fields VHT-LTFs, to generate estimates $H_{EST\_M1}^k$ and $H_{EST\_M2}^k$ of portions of the channel that can be combined to generate an estimate $H_{EST}^k$ of the channel $H^k$:

$$H_{EST}^k = [H_{EST\_M1}^k H_{EST\_M2}^k] \quad \text{(Eq. 3)}$$

In particular, because the matrix P (or the corresponding block-specific matrices) is only applied to the signal associated with a preamble to train the receiving device, the receiving device inverts the matrix P when the signal x is received to estimate the channel H. In other words, the matrix P is not used when the data portion of a data unit is transmitted. Thus, upon undoing the frequency domain transformation corresponding to the CDD matrix D, the estimated channel $H_{EST}^k$ on the carrier k is given by:

$$H_{EST}^k = \quad \text{(Eq. 4)}$$
$$\lfloor H^k Q_{1:N_{TX},1:N_{STS\_M1}}^k \; H^k Q_{1:N_{TX},N_{STS\_M1}+1:N_{STS\_M1}+N_{STS\_M2}}^k \rfloor =$$
$$H^k Q^k$$

It is noted also that for the n-th VHT-LTF field of the m-th block of training fields, the time-domain signal transmitted via a transmit chain $i_{TX}$ is given by:

$$r_{VHT-LTF}^{n\_blkm, i_{tx}}(t) = \frac{1}{\sqrt{N_{STS} N_{VHT-LTF}^{Tone}}} w_{T_{VHT-LTF_n}}(t) \cdot \quad \text{(Eq. 5)}$$
$$\sum_{k=-N_{SR}}^{N_{SR}} \sum_{i_{STS}=1}^{N_{STS\_blkm}} [Q_k^m]_{i_{TX}, i_{STS}} [P_{VHTLTF}^n]_{i_{STS}, n} \gamma_k VHTLTF \; (k) \cdot$$
$$\exp(j2\pi k\Delta_F(t - T_{GI} - T_{CS}^{i_{STS}, n}))$$

In Eq. 5, the exponential term corresponds to the phase shift using the frequency CDD matrix D on the sub-carrier k for the space-time stream $i_{STS}$ of the nth block of VHT-LTFs. The terms $T_{GI}$ and $T_{CS}^{i_{STS}}$ used in defining the exponential term of Eq. 5 are similar to the terms $T_{GI}$ and $T_{CS}$ defined by IEEE 802.11n Standard for four (or fewer) space-time streams, according to an embodiment. Similarly, in an embodiment, the function $\gamma_k$ is defined as in the IEEE 802.11n Standard.

In an embodiment, the values defining the frequency CDD matrix D are consistent with the IEEE 802.11n Standard for each block of VHT-LTFs. In other words, $T_{CS}^{i_{STS}, n}$ is defined according to $i_{STS}$ and is not dependent on n. However, in this embodiment, a receiving device may need to compensate for a phase shift difference in each tone. In another embodiment, frequency CDD values for each block of VHT-LTFs that follows the first block are selected similarly to frequency CDD values applied to the data portion of a data unit, i.e., different values are continuously defined for each block.

Several example formats of data units in which a data portion is modulated using more than four space-time streams (or that omit data to sound more than four space-time streams) according to the techniques of the present disclosure are considered below. In the embodiments discussed below, more than one block of VHT-LTFs is included in the PHY preamble. In an embodiment, each block includes one, two, or four VHT-LTFs. The number of VHT-LTFs in each block corresponds to the number of space-time streams trained by the block, except that four VHT-LTFs are used for three space-time streams as well as for four space-time streams. However, in another embodiment, matrices P and Q can be selected so that three VHT-LTFs are used for three space-time streams. In some embodiments, a matrix P of dimensionality that exceeds the number of space-time streams is used. For example, six VHT-LTFs can be generated using a six-by-six matrix P for five space-time streams. One or more sub-field in the VHT-SIG fields indicate the number of blocks, the size of each block, etc.

According to one implementation, the blocks are deterministically "filled up" so that the number of VHT-LTFs unambiguously implies the structure of VHT-LTF blocks. For example, if $N_{STS}=5$, in an embodiment, the first block includes four (i.e., the maximum number) VHT-LTFs, and the second block accordingly includes one VHT-LTF; if $N_{STS}=6$, in an embodiment, the first block includes four VHT-LTFs, and the second block includes two VHT-LTFs; if $N_{STS}=7$ or $N_{STS}=8$, in an embodiment, each of the first block and the second block includes four VHT-LTFs; etc. Similarly, if more than eight space-time streams are used, in an embodiment, a transmitting device generates at least a third block of VHT-LTFs after the first two blocks are filled up. It is noted that in these embodiments, the MCS field (or a similar field such as STCB) need only indicate the number of VHT-LTFs in the data unit to permit a receiving device to determine the structure of VHT-LTF blocks. In other words, the number of VHT-LTFs indicates the structure of VHT-LTF blocks, in an embodiment.

In an embodiment, each block of VHT-LTFs is generated using the techniques described in the IEEE 802.11n Standard or a similar, suitable technique. For example, a block of two or four VHT-LTFs is described by the same transmission expression as a corresponding block specified by the IEEE 802.11n Standard, according to an embodiment.

In other embodiments, a large P matrix is used rather than several block-specific matrices. A Discrete Fourier Transform (DFT) matrix, in an embodiment, is used as a large $P_{5\times5}$ matrix:

$$P_{5\times5} = \begin{bmatrix} 1 & 1 & 1 & 1 & 1 \\ 1 & w^4 & w^3 & w^2 & w \\ 1 & w^3 & w & w^4 & w^2 \\ 1 & w^2 & w^4 & w & w^3 \\ 1 & w & w^2 & w^3 & w^4 \end{bmatrix}, \text{ where } w = e^{\frac{j2\pi}{5}}$$

Further, suitable matrices with dimensionality of 5 can be generated by permuting rows and/or columns of the matrix $P_{5\times5}$.

In various embodiments of the present disclosure, an appropriately scaled orthogonal matrix of size $N_{STS} \times N_{STS}$ is used as the matrix P. In at least some of these embodiments, such matrix satisfies the condition $$P_{N_{STS} \times N_{STS}} * P_{N_{STS} \times N_{STS}}^T = P_{N_{STS} \times N_{STS}}^T * P_{N_{STS} \times N_{STS}} = N_{STS} * I_{N_{STS} \times N_{STS}} \quad \text{(Eq. 6)}$$

where $I_{N_{STS} \times N_{STS}}$ is the identity matrix.

For $N_{STS}$ space-time streams, the $l^{th}$ transmitted VHT-LTF on the subcarrier k over the available transmit chains is given by $$VHTLTF_l^k = Q_k P_{N_{STS} \times N_{STS}}(:,l) p_k \quad \text{(Eq. 7)}$$

where $P_{N_{STS} \times N_{STS}}(:,l)p_k$ denotes the $l^{th}$ column of the $P_{N_{STS} \times N_{STS}}$ matrix, $Q_k$ is a $N_{TX}$ by $N_{STS}$ spatial mapping matrix, and $p_k$ is the value of the VHT-LTF sequence in the $k^{th}$ tone. In Eq. 7, scaling is omitted.

Several matrices P for several example dimensionalities are listed below. Further, similar to the $P_{5\times5}$ matrix discussed above, additional suitable matrices can be generated by permuting rows and/or columns of the corresponding matrices.

$$P_{6\times6}^1 = \begin{bmatrix} 1 & 1 & 1 & 1 & 1 & 1 \\ 1 & w & w^2 & w^3 & w^4 & w^5 \\ 1 & w^2 & w^4 & w & w^2 & w^4 \\ 1 & w^3 & 1 & w^3 & 1 & w^3 \\ 1 & w^4 & w^2 & 1 & w^4 & w^2 \\ 1 & w^5 & w^4 & w^3 & w^2 & 1 \end{bmatrix}, \text{ where } w = e^{\frac{j2\pi}{6}}$$

$$P_{6\times6}^{DFT} = \begin{bmatrix} 1 & 1 & 1 & 1 & 1 & 1 \\ 1 & w & w^2 & -1 & w^4 & w^5 \\ 1 & w^2 & w^4 & 1 & w^2 & w^4 \\ 1 & -1 & 1 & -1 & 1 & -1 \\ 1 & w^4 & w^2 & 1 & w^4 & w^2 \\ 1 & w^5 & w^4 & -1 & w^2 & w \end{bmatrix}, \text{ where } w = e^{\frac{j2\pi}{3}}$$

$$P_{6\times6}^2 = \begin{bmatrix} 1 & 1 & 1 & 1 & 1 & 1 \\ 1 & w^2 & w & 1 & w^2 & w \\ 1 & w & w^2 & 1 & w & w^2 \\ 1 & 1 & 1 & -1 & -1 & -1 \\ 1 & w^2 & w & -1 & w & w^2 \\ 1 & w & w^2 & -1 & w^2 & w \end{bmatrix}, \text{ where } w = e^{\frac{j2\pi}{3}}$$

$$P_{7\times7} = \begin{bmatrix} 1 & 1 & 1 & 1 & 1 & 1 & 1 \\ 1 & w^6 & w^5 & w^4 & w^3 & w^2 & w \\ 1 & w^5 & w^3 & w & w^6 & w^4 & w^2 \\ 1 & w^4 & w & w^5 & w^2 & w^6 & w^3 \\ 1 & w^3 & w^6 & w^2 & w^5 & w & w^4 \\ 1 & w^2 & w^4 & w^6 & w & w^3 & w^5 \\ 1 & w & w^2 & w^3 & w^4 & w^5 & w^6 \end{bmatrix}, \text{ where } w = e^{\frac{j2\pi}{7}}$$

$$P_{8\times8}^{HADAMARD} = \begin{bmatrix} 1 & 1 & 1 & 1 & 1 & 1 & 1 & 1 \\ 1 & -1 & 1 & -1 & 1 & -1 & 1 & -1 \\ 1 & 1 & -1 & -1 & 1 & 1 & -1 & -1 \\ 1 & -1 & -1 & 1 & 1 & -1 & -1 & 1 \\ 1 & 1 & 1 & 1 & -1 & -1 & -1 & -1 \\ 1 & -1 & 1 & -1 & -1 & 1 & -1 & 1 \\ 1 & 1 & -1 & -1 & -1 & -1 & 1 & 1 \\ 1 & -1 & -1 & 1 & -1 & 1 & 1 & -1 \end{bmatrix}$$

$$P_{8\times8}^{HADAMARD\_EXT} = \begin{bmatrix} 1 & -1 & 1 & 1 & 1 & -1 & 1 & 1 \\ 1 & 1 & -1 & 1 & 1 & 1 & -1 & 1 \\ 1 & 1 & 1 & -1 & 1 & 1 & 1 & -1 \\ -1 & 1 & 1 & 1 & -1 & 1 & 1 & 1 \\ 1 & -1 & 1 & 1 & -1 & 1 & -1 & -1 \\ 1 & 1 & -1 & 1 & -1 & -1 & 1 & -1 \\ 1 & 1 & 1 & -1 & -1 & -1 & -1 & 1 \\ -1 & 1 & 1 & 1 & 1 & -1 & -1 & -1 \end{bmatrix}$$

$$P_{8\times8} = \begin{bmatrix} 1 & 1 & 1 & 1 & 1 & 1 & 1 & 1 \\ 1 & -j & -1 & j & 1 & -j & -1 & j \\ 1 & -1 & 1 & -1 & 1 & -1 & 1 & -1 \\ 1 & j & -1 & -j & 1 & j & -1 & -j \\ 1 & 1 & 1 & 1 & -1 & -1 & -1 & -1 \\ 1 & -j & -1 & j & -1 & j & 1 & -j \\ 1 & -1 & 1 & -1 & -1 & 1 & -1 & 1 \\ 1 & j & -1 & -j & -1 & -j & 1 & j \end{bmatrix}$$

$$P_{8\times 8}^{DFT} = \begin{bmatrix} 1 & 1 & 1 & 1 & 1 & 1 & 1 & 1 \\ 1 & w & w^2 & w^3 & w^4 & w^5 & w^6 & w^7 \\ 1 & w^2 & w^4 & w^6 & 1 & w^2 & w^4 & w^6 \\ 1 & w^3 & w^6 & w & w^4 & w^7 & w^2 & w^5 \\ 1 & w^4 & 1 & w^4 & 1 & w^4 & 1 & w^4 \\ 1 & w^5 & w^2 & w^7 & w^4 & w & w^6 & w^3 \\ 1 & w^6 & w^4 & w^2 & 1 & w^6 & w^4 & w^2 \\ 1 & w^7 & w^6 & w^5 & w^4 & w^3 & w^2 & w \end{bmatrix}, \text{ where } w = e^{\frac{j2\pi}{8}}$$

In the examples listed above, $P_{6\times 6}^{DFT}$ and $P_{8\times 8}^{DFT}$ are DFT matrices, $P_{8\times 8}^{HADAMARD}$ is a Hadamard matrix, and $P_{8\times 8}^{HADAMARD\_EXT}$ is a Hadamard extension of a 4×4 matrix defined in the IEEE 802.11n Standard.

Using an appropriate matrix of dimensionality $N_{STS}$ (such as the ones defined above), a transmitting device in some embodiments generates a preamble with $N_{STS}$ VHT-LTFs for $N_{STS}$ space-time streams. However, in another embodiment, a transmitting device more than $N_{STS}$ VHT-LTFs for $N_{STS}$ space-time streams to obtain a better signal-to-noise ratio (SNR) gain. To this end, the device can use a matrix P of higher dimensionality than $N_{STS}$. For example, for $N_{STS}$=5, a transmitting device generates a preamble with six VHT-LTFs using a 5×6 sub-matrix of a 6×6 matrix P.

Further, using any of the matrices P discussed above, additional suitable matrices can be generated by adding an arbitrary constant phase θ to each element of the matrix, i.e., by multiplying each element by $e^{j\theta}$. The multiplication can be repeated any desired number of times.

Using some of the techniques for defining one or several P matrices discussed herein, communicating devices can generate and process VHT-LTF sequences for (i) Single User (SU) or unresolvable Multi-User (MU) data units having a data portion transmitted over more than four space-time streams (i.e., $N_{STS}$>4), (ii) sounding packets that sound more than four spatial dimensions, and (iii) resolvable MU packets that span more than four space-time streams for a set of users. In this manner, receivers that support data units of more than one of the types (i)-(iii) listed above utilize a simplified architecture, according to an embodiment.

Now referring to FIG. 3A, an example data unit 200 includes a data portion 202 transmitted at a very high rate using six space-time streams, according to an embodiment. To enable a receiving device to properly demodulate the data portion 202, the data unit 200 in this embodiment includes a preamble with two blocks, 204 and 206, in which the total of six VHT-LTFs are included so as to allow a receiving device to estimate the channel. In particular, the block 204 includes four VHT-LTFs 210-1, 210-2, 210-3, and 210-4, and the block 206 includes two VHT-LTFs 212-1 and 212-2. As discussed above, each of the blocks 204 and 206 is generated using corresponding matrices P and Q, according to an embodiment. For example, a transmitting device sequentially applies columns of a four-by-four matrix $P_1$ to the VHT-LTFs 210-1, . . . 210-4 in the block 204, and uses the first four columns of a matrix Q for spatial mapping. The transmitting device then sequentially applies columns of a two-by-two matrix $P_2$ to the VHT-LTFs 212-1 and 212-2 in the block 206, and uses the next two columns of the matrix Q for spatial mapping.

In one such embodiment, the transmitting device uses the data unit 200 to transmit the data portion 202 over six space-time streams via eight transmit antennas (i.e., $N_{STS}$=6, $N_{TX}$=8), as an example. The spatial mapping matrix Q includes $N_{TX}$=8 rows and $N_{STS}$=6 columns, in this example.

In an embodiment, the transmitting device uses a matrix $Q_1$, defined as the first four columns of the matrix Q, when generating the block 204, and a matrix $Q_2$, defined as the last two columns of the matrix Q, when generating the block 206.

With continued reference to FIG. 3A, the data unit 200 is suitable for "mixed mode" situations and includes a legacy portion with an L-STF field 221, an L-LTF field 222, and an L-SIG field 223. The fields 221-223 are generally similar to the fields with the corresponding functions discussed with reference to FIGS. 2A-F, in an embodiment. The data unit 200 further includes a VHT-SIG field 224 with parameters related to the high-throughput portion of the data unit 200, i.e., a VHT-STF field 225, the block 204, the block 206, and the data portion 202. In an embodiment, the MCS sub-field in the VHT-SIG field 224 specifies the number of VHT-LTFs included in the data unit 200. In another embodiment, the MCS specifies the structure used to block VHT-LTFs, e.g., a certain value indicates that two blocks with respective sizes four and two are used. In yet another embodiment, more than one sub-field in the VHT-SIG field 224 is used to specify how VHT-LTFs are structured in the data unit 200.

FIG. 3B is a diagram of an example data unit 230 in which a data portion 232 is modulated with six space-time streams similar to the data unit 200, in an embodiment. Unlike the data unit 200, however, the data unit 230 is suitable for a Greenfield mode of operation. Also unlike the data unit 200, the data unit 230 includes a first VHT-LTF 234, a first block 236 of three VHT-LTFs, and a second block 238 of two VHT-LTFs. In an embodiment, different matrices P and Q are applied to the blocks 236 and 238, and the six VHT-LTFs are spatially mapped and transmitted so as to allow a receiver device to derive information regarding the communication channel (that includes the six space-time streams) using the six received VHT-LTFs, and accordingly receive the data portion 232. Additionally, the VHT-STF 240 and the first VHT-LTF 234 occur before the VHT-SIG field 242.

FIG. 4A is a diagram of an example data unit 250 in which a data portion 252 is modulated with six space-time streams, but a preamble portion includes two additional (or "extension") training fields, EVHT-LTFs 254-1 and 254-2, to be used for staggered sounding, in an embodiment. Thus, $N_{STS}$=6 and $N_{ESS}$=2, and the total number of space-time streams that are trained using the data unit 250 is 6+2=8, in an embodiment. The EVHT-LTFs 254-1 and 254-2 are positioned following a sequence of five "data" VHT-LTFs (DVHT-LTFs) 256-2 . . . 256-6. Because the data unit 250 is used in the Greenfield mode, the first DVHT-LTF 256-1 is transmitted prior to the VHT-SIG field 258.

In this embodiment, the fields 256-2, 256-3, and 256-4 define the first block of training fields, and the fields 256-5, 256-6, 254-1, and 254-2 define the second block of training fields. The manner in which the second block is formed is referred to herein as "continuous placement." As discussed above, different matrices P and Q and, in some cases, frequency CDD matrices D are applied to each of the first block and the second block. In other words, each block is associated with a different spatial mapping scheme.

A data unit 270 illustrated in FIG. 4B is generally the same as the data unit 250 of FIG. 4A, with the first block consisting of the four DVHT-LTFs that follow the VHT-SIG field, except that the last two DVHT-LTFs are grouped together to define the second block, and the two EVHT-LTFs are grouped together to define a third block, in an embodiment. The manner in which the second and the third blocks are formed is referred to herein as "segmented placement." Similar to the examples discussed above, different spatial mapping matrices Q and/or different matrices P and D are used with different blocks. In some embodiments, the matrices used for different blocks have different dimensionalities.

As another example, a data unit 280 illustrated in FIG. 4C is characterized by $N_{STS}=N_{ESS}=2$, and is generated according to continuous placement, in an embodiment. Accordingly, the DVHT-LTF 282 that follows the VHT-SIG field 284 is grouped with EVHT-LTFs 286-1 and 286-2 to define a continuous block. Similar to the examples discussed above, the continuous block is associated with a certain mapping matrix Q as well as matrices P and D. By contrast, the EVHT-LTFs fields in a data unit 290, depicted in FIG. 4D, are grouped together to define a block separate from the DVHT-LTF that immediately precedes the EVHT-LTFs, in an embodiment. In an embodiment, the two blocks are associated with different spatial mapping schemes (e.g., matrices Q).

In some embodiments that utilize DVHT-LTFs as well as EVHT-LTFs, a dedicated field signals the number of EVHT-LTFs. In one example format, an $N_{ESS}$ field in VHT-SIG includes K bits to signal up to $N_{ESS}=2^K-1$ space-time streams being sounded in the data unit in addition to the $N_{STS}$ space-time streams specified in the MCS field. In an embodiment, the value of $N_{ESS}$ also implies the structure (e.g., continuous, segmented, etc.) of blocks of training fields in the data unit.

Figure 5A:
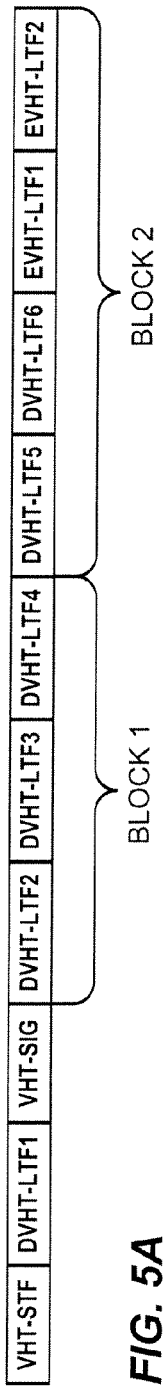
FIG. 5A is a diagram of an example format of a sounding data unit that includes a preamble with two blocks of training fields, according to an embodiment.

Referring to FIG. 5A, an example data unit 300 generally has the same format as the data unit 250 illustrated in FIG. 4A, except that the data unit 300 does not include a data portion, in an embodiment. Accordingly, the data unit 300 is an NDP designed for use in the Greenfield mode of operation, and includes eight training fields grouped according to the continuous placement technique discussed above.

Figure 5B:
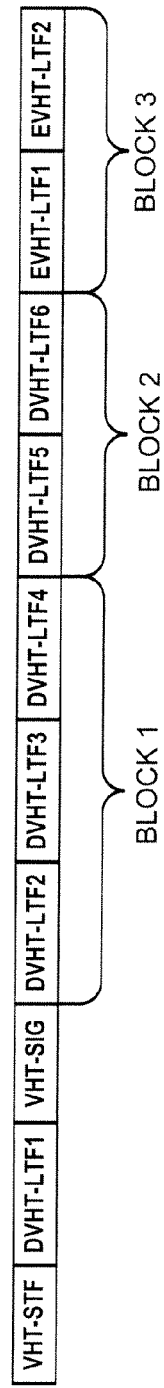
FIG. 5B is a diagram of an example format of a sounding data unit that includes a preamble with three blocks of training fields, according to an embodiment.

FIG. 5B illustrates a data unit 310 that generally has the same format as the data unit 270 illustrated in FIG. 4B, except that the data unit 310 is an NDP, and accordingly a data portion is omitted, in an embodiment. The data unit 310 is designed for use in the Greenfield mode of operation, and includes eight training fields grouped according to the segmented placement technique discussed above.

Figure 5C:
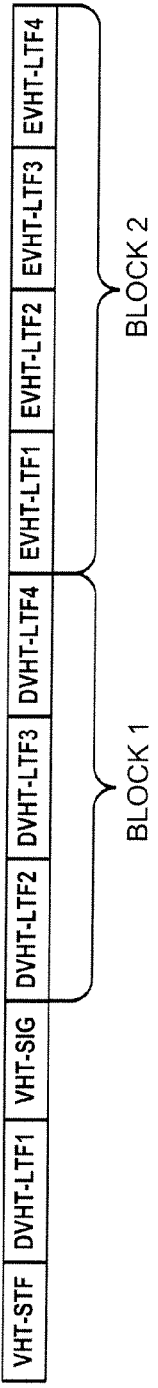
FIG. 5C is a diagram of another example format of a sounding data unit that includes a preamble with two blocks of training fields, according to an embodiment.

As an additional example, FIG. 5C illustrates a data unit 320 that includes four DVHT-LTFs and four EVHT-LTFs, i.e., $N_{STS}=N_{ESS}=4$, in an embodiment. Thus, as in the examples o FIGS. 5A and 5B, the total number of VHT-LTFs in the data unit 320 is eight. In this example, the continuous placement technique and the segmented placement technique generate the same grouping of VHT-LTFs: a block of three DVHT-LTFs followed by a block of four EVHT-LTFs.

Figure 5D:
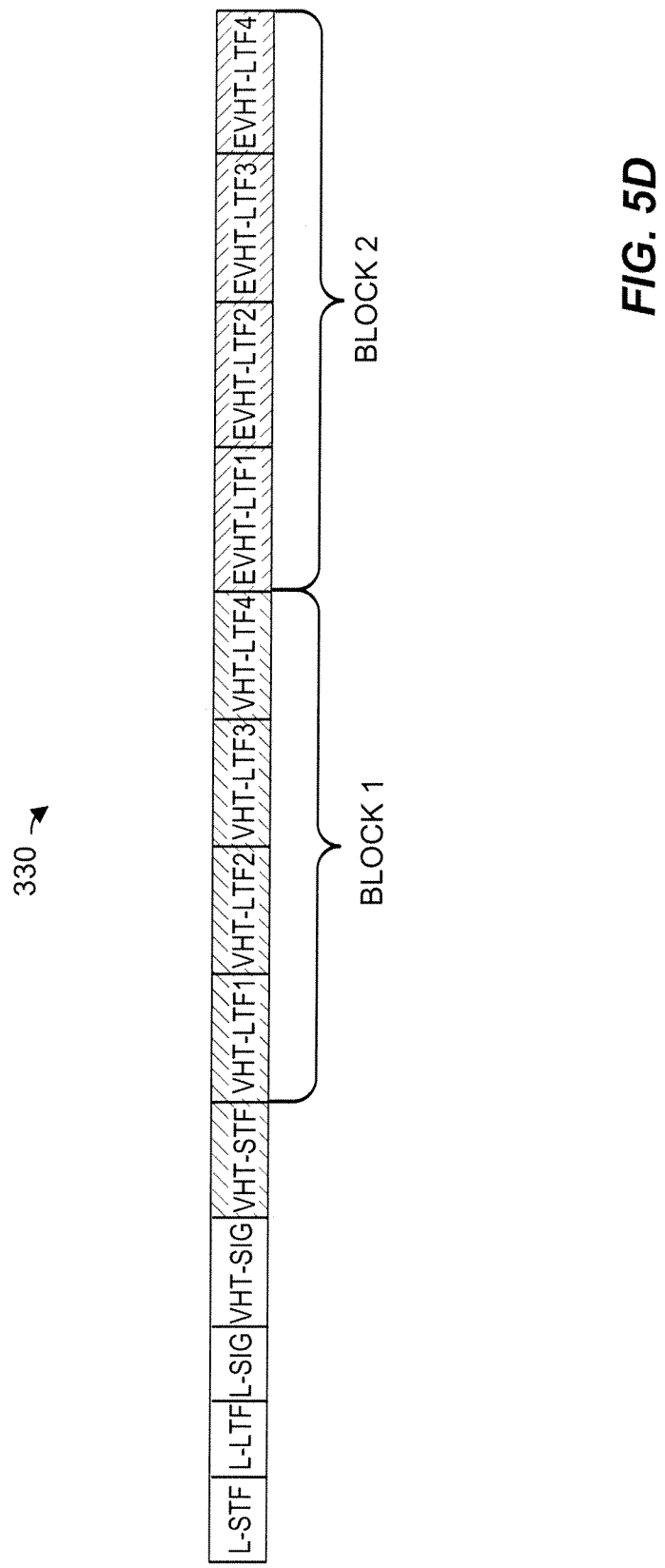
FIG. 5D is a diagram of another example format of a sounding data compatible with a mixed mode of communications, according to an embodiment.

FIG. 5D illustrates an example data unit 330 for use as an NDP in a mixed mode of communications, in an embodiment. In one embodiment of a communication system that uses the data unit 330, a transmitting device sets each of the MCS field and the $N_{ESS}$ field to 4 to sound eight space-time streams. The eight VHT-LTFs are grouped into two four-field blocks.

In the formats illustrated in FIGS. 5A-D, different spatial mapping matrices Q and/or different matrices P and D are used with different blocks. In some embodiments, the matrices used for different blocks have different dimensionalities.

The use of NDPs for estimating a MIMO channel is further discussed with reference to FIGS. 6A and 6B. First referring to FIG. 6A, in an embodiment, a device such as a station (STA) A transmits an NDP announcement 352 to a STA B. Because an NDP does not include a data portion with MAC information, the NDP announcement 352 includes one or several information elements to convey MAC information related to a subsequent NDP 354. Following a Short Inter Frame Space (SIFS), STA A transmits the NDP 354 that in some embodiments is formatted using the techniques discussed above. In some embodiments, the NDP announcement 352 is related to multiple NDPs (not shown) to be used for transmit beamforming, antenna selection, link adaptation, etc.

In the example of FIG. 6A, STA B does not transmit an acknowledgement in response to receiving the NDP announcement 352. In another embodiment illustrated in FIG. 6B, STA B receives an NDP announcement 362 from STA A, transmits an acknowledgement 364 after a first SIFS interval. STA A transmits an NDP 366 after a second SIFS interval. In some embodiments, an NDP announcement includes a field that indicates whether the transmitting device expects to receive an acknowledgement responsive to the NDP announcement.

As indicated above, a transmitting device in some embodiments generates an NDP with multiple blocks of VHT-LTFs to sound more than four space-time channels. In other embodiments, a transmitting device generates groups, or "bursts," of NDP packets, each of which is capable of sounding up to four space-time streams, so as to sound a total of N>4 space-time streams. Of course, this approach similarly applies to any limit on the number of space-time streams being sounded by a single NDP (e.g., 6, 8). In yet other embodiments, a transmitting device generates a burst of NDP packets, where one or more NDP packets individually sound more than four space-time streams. In this manner, any desired number of space-time streams can be sounded and trained.

Figure 7:
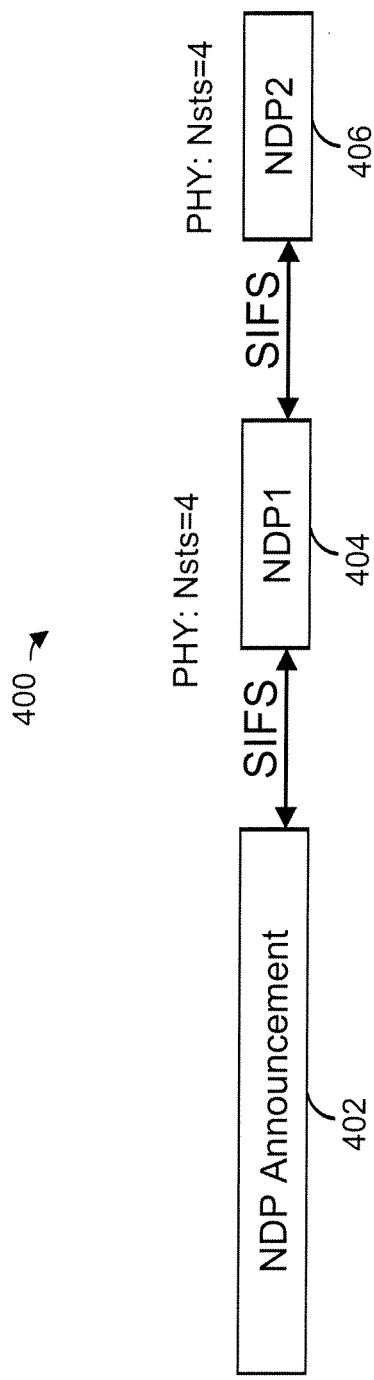
FIG. 7 is a timing diagram of transmitting, in two sounding data units, information for estimating a communication channel associated with eight space-time streams.

FIG. 7 is a diagram that illustrates a sequence 400 in which an NDP announcement 402 specifies that eight space-time streams are to be trained using two NDPs, in an embodiment. In some embodiments, the NDP announcement 402 includes an information element (e.g., a field in the MAC layer) that specifies the total number of NDPs that will follow the NDP announcement 402. In other embodiments, NDP announcement 402 includes an information element that specifies the total number of space-time streams to be trained in a burst of NDPs that will follow the NDP announcement 402. In one such embodiment, a receiving device divides the total number of space-time streams specified in the NDP announcement 402 by the maximum number of VHT-LTFs allowed in a single NDP (e.g., four) to determine the number of NDPs to be transmitted. In the example illustrated in FIG. 7, the transmitting device trains eight transmit antennas using NDPs 404 and 406, each including four VHT-LTFs. Similar to the examples discussed above, the transmitting device applies different matrices P and Q for each NDP that follows the NDP announcement 402. In this sense, the NDPs 404 and 406 are analogous to blocks of VHT-LTFs included in a single data unit, as illustrated in FIGS. 5A-C for example.

In general, the techniques for generating blocks of VHT-LTFs discussed above can be applied to data units consistent with any format. For example, these techniques are compatible with various selections of formatting, positioning within a data unit, and modulation of the fields L-SIG or VHT-SIG. Several such formats are described in U.S. patent application Ser. No. 12/758,603, filed on Apr. 12, 2010 and entitled "Physical Layer Frame Format for WLAN," the entire disclosure of which is expressly incorporated by reference herein. Further, the number of blocks, as well as the number of VHT-LTFs in each block, varies according to a particular implementation. As just one example, a data unit generated using the techniques discussed above can include eight blocks of VHT-LTF units, with up to six VHT-LTF units in each block.

As indicated above, a transmitting device in some embodiments uses a large P matrix rather than several block-specific P matrices. Using a large P matrix in some embodiments allows a transmitting device to generate as many VHT-LTFs as there are space-time streams in a particular configuration. Referring back to the example large P matrices listed above, the matrix $P_{8 \times 8}^{HADAMARD}$ includes only the values of 1 and −1, and requires that eight VHT-LTFs be used if the number of space-time streams used to transmit data is five, six, seven, or eight. Although using eight VHT-LTFs for less than eight space-time streams reduces the efficiency of the corresponding communication link (by using some of the bandwidth for training rather than data transfer), a large P matrix in which each element is 1 or −1 also reduces the computation complexity of generating a preamble at a transmitting device and processing the preamble at a receiving device. In an example embodiment, a receiving device processes a preamble having eight VHT-LTFs, generated using $P_{8 \times 8}^{HADAMARD}$, using only adders.

On the other hand, a matrix that includes integers other than 1 and −1 in some embodiments provides a "power bump" to some of the VHT-LTFs in a sequence of VHT-LTFs defining one or several blocks. Communicating devices can implement VHT-LTFs generation using such a matrix with shifters and adders. Although this technique requires a higher level of computational complexity, communicating devices in some cases reduce the number of VHT-LTFs included in a preamble. For example, six VHT-LTFs are transmitted if the number of space-time streams if five or six, and eight VHT-LTFs are transmitted if the number of space-time streams if seven or eight, according to an embodiment.

Further, to implement a large P matrix in which some elements are complex numbers (e.g., $P_{6 \times 6}^{1}$, $P_{6 \times 6}^{DFT}$, $P_{7 \times 7}$, $P_{8 \times 8}$, $P_{8 \times 8}^{DFT}$) a communicating device requires complex multiplies in at least some of the embodiments. However, communicating devices offset the increased computational complexity by reducing the number of VHT-LTFs transmitted in excess of the number of space-time streams. In an embodiment, a transmitting device generates as many VHT-LTFs as there are space-time streams, i.e., $N_{LTF} = N_{STS}$.

When a large P matrix is used to generate VHT-STFs and $N_{LTF}$ VHT-LTFs, the transmitted VHT-STFs are given by:

$$VHTSTF^{(k)} = Q_{N_{TX} \times N_{STS}}^{(k)} P_{*1} s(k), s(k) \neq 0 \qquad \text{(Eq. 8A)}$$

and the transmitted VHT-LTFs at sub-carrier k are given by $$[VHTLTF_1^{(k)} \ldots VHTLTF_{N_{LTF}}^{(k)}] = Q_{N_{TX} \times N_{STS}}^{(k)} D_{N_{TX} \times N_{STS}}^{(k)} P_{N_{STS} \times N_{LTF}} l(k), \qquad \text{(Eq. 8B)}$$

where s(k) and l(k) are short training sequences and long training sequences, respectively. If, on the other hand, a segmented technique is used to generate two blocks of VHT-LTFs, each including $N_{LTF1}$ and $N_{LTF2}$ VHT-LTFs to train $N_{STS1}$ and $N_{STS2}$ space-time streams respectively, the VHT-STFs and VHT-LTFs are given by $$VHTSTF^{(k)} = Q_{1:N_{STS1}}^{(k)} D_{N_{STS1} \times N_{STS1}}^{(k)} P_{*1} s(k), s(k) \neq 0 \qquad \text{(Eq. 9A)}$$

$$[VHTSTF_{SEG1}^{(k)} \ldots VHTSTF_{SEG2}^{(k)}] = [Q_{1:N_{STS1}}^{(k)} D_{N_{STS1} \times N_{STS1}}^{(k)} P_{N_{STS} \times N_{LTF1}} \quad Q_{N_{STS1}+1:N_{STS1}+N_{STS2}}^{(k)} D_{N_{STS2} \times N_{STS2}}^{(k)} P_{N_{STS2} \times N_{LTF2}}] \cdot l(k) \qquad \text{(Eq. 9B)}$$

In Eq. 8A-9B, power normalization factors are ignored for simplicity.

In some embodiments, a large P matrix is used for Downlink Multi-User MIMO (DL-MUMIMO) resolvable VHT-LTFs, to avoid power fluctuations between VHT-STF and VHT-LTF at a receiving device. In these embodiments, VHT-STFs and VHT-LTFs are given by:

$$VHTSTF^{(k)} = [Q_{N_{TX} \times N_{STS1}}^{(k)} D_{N_{STS1} \times N_{STS1}}^{(k)} Q_{N_{TX} \times N_{STS2}}^{(k)} D_{N_{STS2} \times N_{STS2}}^{(k)} \ldots Q_{N_{TX} \times N_{STSK}}^{(k)} D_{N_{STSK} \times N_{STSK}}^{(k)}] \cdot P_{*1} s(k) \qquad \text{(Eq. 10A)}$$

$$[VHTLTF_1^{(k)} \ldots VHTLTF_{N_{LTF}}^{(k)}] = [Q_{N_{TX} \times N_{STS1}}^{(k)} D_{N_{STS1} \times N_{STS1}}^{(k)} Q_{N_{TX} \times N_{STS2}}^{(k)} D_{N_{STS2} \times N_{STS2}}^{(k)} \ldots Q_{N_{TX} \times N_{STSK}}^{(k)} D_{N_{STSK} \times N_{STSK}}^{(k)}] \cdot P_{N_{STS\_TOTAL} \times N_{LTF}} l(k) \qquad \text{(Eq. 10B)}$$

On the other hand, in some embodiments, DL-MUMIMO unresolvable VHT-LTFs are similar to VHT-LTFs in SU data units. In an embodiment, unresolvable VHT-LTFs are signaled with a corresponding value of the Group Identity flag in a VHTSIG field.

With respect to Uplink Multi-User MIMO (UL-MUMIMO) VHT-LTFs, a large P matrix is used in at least some of the embodiments to avoid power fluctuations between VHT-STF and VHT-LTF at an access point (AP). In these embodiments, UL clients jointly transmit the total number of VHT-LTFs to train the totality of space-time streams used by the clients. The clients thus define a large P matrix, with different clients associated with different rows of the matrix. In an embodiment, the AP specifies client identity and the number of space-time streams ($N_{STS}$) assigned to each client using a synchronization frame. At a client u, according to an embodiment, transmitted training fields are given by:

$$VHTSTF_u^{(k)} = Q_{N_{TXu} \times N_{STSu}} D_{N_{STSu} \times N_{STSu}}^{(k)} P_{u\_*1} s(k), \quad s(k) \neq 0 \qquad \text{(Eq. 11A)}$$

$$[VHTLTF_{u1}^{(k)} \ldots VHTLTF_{uN_{LTF}}^{(k)}] = \qquad \text{(Eq. 11B)}$$

$$Q_{N_{TXu} \times N_{STSu}}^{(k)} D_{N_{STSu} \times N_{STSu}}^{(k)} P_{u\_N_{STSu} \times N_{LTF}} l(k)$$

In this embodiment, the VHT-LTFs received at the AP are given by:

$$[r^{(k)}_{LTF1} r^{(k)}_{LTF2} \ldots r^{(k)}_{LTFN_{LTF}}] = [H^{(k)}_{1\_N_{RX} \times N_{TX1}} Q^{(k)}_{N_{TX1} \times N_{STS1}} D^{(k)}_{N_{STS1} \times N_{STS1}} \ldots H^{(k)}_{K\_N_{RX} \times N_{TXK}} Q^{(k)}_{N_{TXK} \times N_{STSK}} D^{(k)}_{N_{STSK} \times N_{STSK}}] \begin{bmatrix} P_{1\_N_{STS1} \times N_{LTF}} \\ P_{2\_N_{STS2} \times N_{LTF}} \\ \vdots \\ P_{K\_N_{STSK} \times N_{LTF}} \end{bmatrix} \cdot l(k) \quad \text{(Eq. 11C)}$$

To consider an additional example of generating a preamble for use in staggered sounding, in an embodiment of a transmitting device, $N_{TX}=8$, and the number $N_{DSTS}$ of space-time streams used for the data portion is 1. The transmitting device generates two blocks (or segments) of four VHT-LTFs each, with the first block corresponding to one data space-time stream and three extension space-time streams. In an embodiment, the data portion of the data unit is spatially mapped using the first column of Q. The transmitted signal corresponding to the sequence of VHT-LTFs in this example scenario is given by:

$$[X_{HTLTF\_SEG1}^{(k)} X_{HTLTF\_SEG2}^{(k)}] = [Q_{1:4}^{(k)} D_{4 \times 4}^{(k)} P_{4 \times 4} Q_{5:8}^{(k)} D_{4 \times 4}^{(k)} P_{4 \times 4}] \cdot s(k) \quad \text{(Eq. 12)}$$

Figure 8:
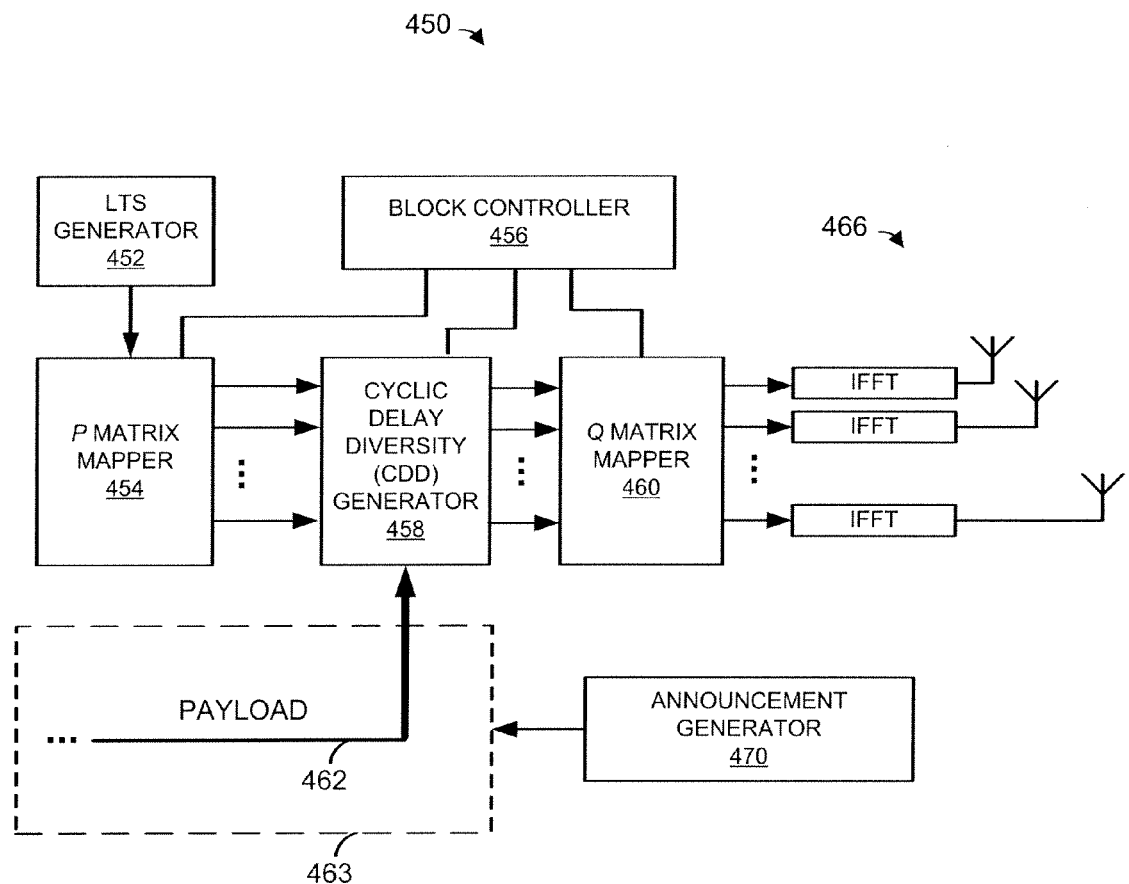
FIG. 8 is a block diagram of an example physical layer (PHY) preamble generator used to generate preambles according to formats of FIG. 3A-B, 4A-D, 6A-C, or 7A-B, according to various embodiments.

Now referring to FIG. 8, an example PHY preamble generator 450 operates in the PHY unit 20 of the device 14 illustrated in FIG. 1, according to an embodiment. The PHY preamble generator 450 includes a long training symbol (LTS) generator 452 to generate symbols of an VHT-LTF field. In an embodiment, the LTS generator 452 generates (or stores) a suitable sequence of symbols (e.g., bits) such as a similar or identical LTF sequence defined in the IEEE 802.11n Standard. The sequence of symbols is supplied to a P matrix mapper 454 that maps symbols to space-time streams. The P matrix mapper 454 applies a mapping scheme in accordance with a selection signal generated by a block controller 456. In an embodiment, the block controller 456 selects the P matrix of a particular dimensionality to be applied to a particular block of VHT-LTFs. The block controller 456 selects a four-by-four matrix $P_1$ to be applied to a block of four VHT-LTFs and a two-by-two matrix $P_2$ to be applied to a block of two VHT-LTFs.

The outputs of the P matrix mapper 454 are coupled to respective inputs of a CDD generator 458 that applies frequency cyclic delay diversity values to the corresponding space-time streams. In an embodiment, the block controller 456 additionally controls the selection of values by the CDD generator 458. As indicated above, the application of a CDD matrix D in some embodiments is equivalent to applying linear phase shifts over different sub-carriers of OFDM. In an embodiment, the CDD generator 458 additionally receives a data payload via a line 462 from a data portion generator 463. Thus, the PHY preamble generator 450 in this embodiment applies CDD transformation to both preamble and data portions of data units, but utilizes the P matrix only for training in preamble portions.

The outputs of the CDD generator 458 are coupled to a Q matrix mapper 460 that performs spatial mapping of space-time streams to transmit chains 466, each including at least a respective transmit antenna. Similar to the P matrix mapper 454, the Q matrix mapper 460 is communicatively coupled to the block controller 456 that selects an appropriate matrix Q for each block of VHT-LTFs. In various embodiments, the PHY preamble generator 450 generates the preambles of data units illustrated in FIG. 3A-B, 4A-D, or 5A-D.

In an embodiment, the modules 454-460 together operate as a spatial mapping module that applies different spatial mapping to each training field. In particular, the module 454 operates as a symbol mapping module that maps symbols to space-time streams that are subsequently mapped to transmit chains.

Further, in an embodiment, the PHY preamble generator 450 includes an announcement generator 470 to generate one or several MAC fields that specify the number of VHT-LTFs and/or the number of NDPs to be transmitted during a subsequent burst of NDPs.

Figure 9:
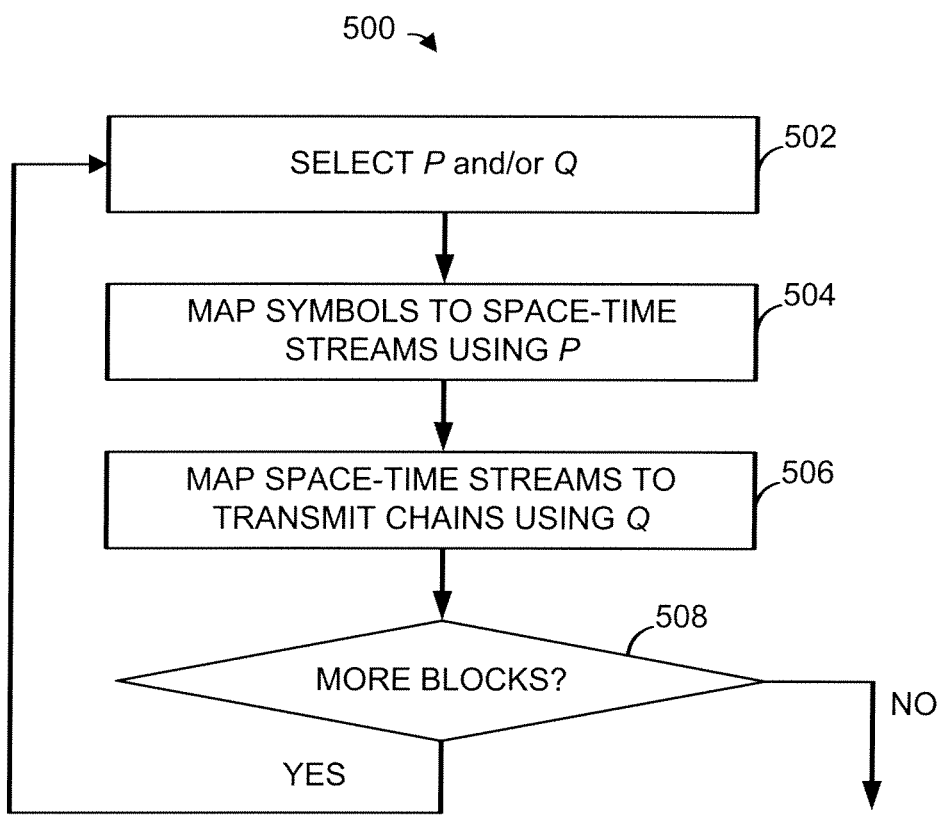
FIG. 9 is a flow diagram of an example method for generating a PHY preamble in accordance with an embodiment of the present disclosure.

Referring to FIG. 9, a method 500 for generating a PHY preamble is implemented by the PHY preamble generator 450 or by a similar module, according to an embodiment. At block 502, matrices P and Q are selected for a particular block of VHT-LTF units. In some embodiments, each block includes 1, 2, 3, or 4 VHT-LTFs. The matrices P and Q are selected depending on the number of VHT-LTFs in the block, the relative order of the block within a sequence of blocks, and/or other factors. As explained above, a sequence of two or more blocks can be associated with a single data unit (see, e.g., FIG. 4B) or multiple data units in a burst mode of NDP transmission, for example (see, e.g., FIG. 7).

Next, at block 504, symbols of a certain VHT-LTF are mapped to space-time streams according to the mapping defined by P, and the resulting space-time streams are mapped to transmit chains according to the mapping defined by Q at block 506. In some embodiments, a CDD matrix is also applied to the space-time streams. At block 508, the total number of blocks to be transmitted is checked to determine whether additional blocks need to be generated and transmitted. If it is determined that more blocks are to follow, the control returns to block 502. Otherwise, the method 500 completes.

Although the techniques for generating and processing a preamble of a data unit are discussed above primarily with reference to Single User (SU) data units (e.g., sounding packets, data units including a payload), these techniques are similarly applicable to Downlink Multi-User (DLMU) packets and Uplink Multi-User (ULMU) packets. Several example techniques for generating and processing DLMU and ULMU data units are described in U.S. patent application Ser. No. 12/175,501, filed on Jul. 18, 2008 and entitled "Wireless Network with Simultaneous Uplink Transmission of Independent Data from Multiple Client Stations," and U.S. patent application Ser. No. 12/730,651 entitled "OFDMA with Block Tone Assignment for WLAN," filed Mar. 24, 2010, both of which are expressly incorporated by reference herein in their entireties.

Further, in view of the discussion of large P matrices above, it is noted that a method for generating a data unit for transmission via a communication channel, so that a receiver device can receive data via the more than four space-time streams using channel information derived from the data unit, has been disclosed. In an embodiment, the method includes generating a preamble of a data unit, including (i) generating a set of more than four training fields, and (ii) applying a column of a mapping matrix P with a dimensionality equal to or exceeding the number of training fields to each training field, where the mapping matrix maps information to space-time streams. In an embodiment, each element of the mapping matrix is 1 or −1. In another embodiment, at least some of the elements of the mapping matrix are complex numbers. In another embodiment, at least some of the elements of the mapping matrix are integers other than 1 or −1. In an embodiment, the mapping matrix is a DFT matrix. In an embodiment, the mapping matrix is a Hadamard matrix. In an embodiment, a new mapping matrix is generated by permuting at least one of a pair of rows of the mapping matrix and a pair of columns of the mapping matrix. In an embodiment, a new mapping matrix is generated by applying an arbitrary constant phase to each element of the mapping matrix.

Also disclosed herein is a method for generating a PHY preamble of a data unit for transmission via a communication channel, where the preamble is generated according to a certain format, so that a receiver device can receive at least two of (i) a SU data unit transmitted using more than four space-time streams, (ii) a sounding data unit to sound more than four spatial dimensions, and (iii) a resolvable MU data unit that spans more than four space-time streams for a set of users, using the certain format. In an embodiment, the format is associated with using a mapping matrix P of dimensionality greater than four.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for generating a data unit for transmission via a communication channel, the method comprising:
generating a preamble of the data unit, including:
generating a set of more than four training fields, and
applying a different spatial mapping to each training field in the set of training fields; and
generating a data portion of the data unit, wherein the data portion is transmitted using more than four space-time streams, so that a receiver device can receive the data portion via the more than four space-time streams using channel information derived from the set of training fields.

2. The method of claim 1, wherein generating the set of training fields includes:
generating a first block of training fields, wherein the first block of training fields is mapped to a plurality of transmit chains according to a first spatial mapping matrix; and
generating a second block of training fields, wherein the second block of training fields is mapped to the plurality of transmit chains according to a second spatial mapping matrix.

3. The method of claim 2, wherein the first spatial mapping matrix and the second spatial mapping matrix are Hadamard matrices.

4. The method of claim 2, wherein
the first spatial mapping matrix is a square matrix having a first dimension, and
the second spatial mapping matrix is a square matrix having a second dimension,
wherein the first dimension is not equal to the second dimension.

5. The method of claim 2, wherein a tuple defining a size of the first block and a size of the second block is one of (four, four), (four, two), and (four, one).

6. The method of claim 2, wherein generating the set of training fields further includes applying a different symbol-mapping matrix as each of the first block and the second block is generated, wherein the symbol-mapping matrix maps symbols to space-time streams.

7. The method of claim 1, wherein generating a preamble of the data unit further includes generating an information element that specifies a size of the set of training fields.

8. The method of claim 1, wherein generating the preamble of the data unit further includes generating a legacy portion decodable by a receiver device capable of receiving data using no more than one space-time stream.

9. A communication device, comprising:
a physical layer (PHY) preamble generator configured to generate a preamble of a data unit, the PHY preamble generator including:
a training field generator configured to generate a training field, and
a spatial mapping module configured to apply a different spatial mapping to each of at least five instances of the training field to be included in the preamble, wherein the at least five instances of the training field correspond to at least five space-time streams; and
wherein the communication device further comprises a data portion generator to cause a data portion of the data unit to be transmitted using the at least five space-time streams.

10. The communication device of claim 9, wherein the PHY preamble generator further includes:
a block controller configured to generate (i) a first block having one or more of the at least five instances of the training field and (ii) a second block having one or more of the at least five instances of the training field;
wherein the spatial mapping module applies a different spatial mapping matrix for each of the first block and the second block.

11. The communication of claim 9, wherein the PHY preamble generator further includes a symbol mapping module configured to map a plurality of symbols included in the training field to space-time streams to generate space-stream outputs;
wherein the spatial mapping module is configured to apply the different spatial mappings to the space-streams outputs.

12. The communication device of claim 11 wherein the PHY preamble generator further includes a cyclic delay diversity (CDD) generator configured to apply phase shift values to the space-stream outputs.

13. A method for sounding a communication channel, the method comprising:
generating a set of at least five training fields, wherein the set of training fields corresponds to a set of at least five space-time streams, such that a receiver device can estimate the set of space-time streams using the set of training fields;
mapping each training field in the set of training fields to a set of transmit chains according to a different spatial mapping vector; and
causing the data unit to be transmitted with the set of at least five training fields and without a data portion.

14. The method of claim 13, wherein generating the set of at least five training fields includes:
generating a first block of training fields;
generating a second block of training fields;
mapping the first block of training fields to a plurality of transmit chains according to a first spatial mapping matrix; and
mapping the second block of training fields to the plurality of transmit chains according to a second spatial mapping matrix.

15. The method of claim 14, wherein the first block includes four training fields, and the second block includes one, two, or four training fields.

16. The method of claim 13, wherein a number of training fields in the set of training fields is equal to a number of space-time streams in the set of space-time streams; and
wherein the generating the set of training fields includes generating a plurality of blocks, each block including one or several training fields;
wherein the method further comprising mapping the plurality of blocks using respective spatial mapping matrices.

17. The method of claim 13, wherein a number of training fields in the set of training fields is indicated in an information element of an announcement data unit transmitted prior to the data unit.

18. A communication device, comprising:
a physical layer (PHY) preamble generator configured to generate a preamble of a data unit that does not include a data portion, the PHY preamble generator including:
a training field generator configured to generate a training field,
a spatial mapping module configured to apply a different spatial mapping to each of at least five instances of the training field to be included in the preamble, wherein the at least five instances of the training field correspond to at least five space-time streams, and
a block generator to generate a plurality of blocks, wherein each of the plurality of blocks includes one or more instances of the training field;
wherein the spatial mapping module applies a different spatial mapping matrix to each of the plurality of blocks.

19. The communication device of claim 18, wherein a first one of the plurality of blocks includes four instances of the training field, and a second one of the plurality of blocks includes two instances of the training field.

20. The communication device of claim 18, wherein the PHY preamble generator further includes a symbol mapping module to (i) map a plurality of symbols included in the training field to space-time streams to generate space-stream outputs and (ii) apply a different symbol-mapping matrix to each of the plurality of blocks.

21. A method of communicating via a communication channel, the method comprising:
generating a first data unit that includes a first set of N training fields, wherein the first set of training fields corresponds to a first set of N space-time streams associated with the communication channel;
generating a second data unit that includes a second set of M training fields, wherein the second set of training fields corresponds to a second set of M space-time streams associated with the communication channel; and
wherein the first set of space-time streams is distinct from the second set of space-time streams, such that a receiver device can estimate the N+M space-time streams associated with the communication channel using the first data unit and the second data unit.

22. The method of claim 21, further comprising transmitting an announcement data unit prior to transmitting the first data unit and the second data unit, wherein the announcement data unit indicates that N+M training fields will be transmitted using more than one data unit.

23. The method of claim 21, wherein generating each of the first data unit and the second data unit includes using a respective spatial mapping matrix to map space-time streams to transmit chains.

24. A communication device, comprising:
a physical layer (PHY) preamble generator configured to generate a preamble of a data unit to be transmitted via a communication channel, the PHY preamble generator including:
a training field generator configured to generate a training field,
a block controller configured to generate a plurality of blocks, wherein each of the plurality of blocks includes two or more instances of the training field, and
a spatial mapping module configured to apply a different spatial mapping scheme to each of the plurality of blocks, such that each of the instances of the training field trains a different space-time stream associated with the communication channel.

25. The communication device of claim 24, wherein the plurality of blocks are included in a single data unit.

26. The communication device of claim 24, wherein the plurality of blocks are included in a plurality of data units.

* * * * *